(12) United States Patent
Karb et al.

(10) Patent No.: US 9,409,356 B2
(45) Date of Patent: Aug. 9, 2016

(54) METHOD FOR MANUFACTURING FIBRE LAYERS

(75) Inventors: Ingo Karb, Leonberg (DE); Rainer Kehrle, Pfullendorf-Hilpensberg (DE); Volker Witzel, Loechgau (DE)

(73) Assignee: COMPOSITENCE GMBH, Leonberg (DE)

(*) Notice: Subject to any disclaimer, the term of this patent is extended or adjusted under 35 U.S.C. 154(b) by 616 days.

(21) Appl. No.: 13/641,247

(22) PCT Filed: Apr. 15, 2011

(86) PCT No.: PCT/EP2011/001931
§ 371 (c)(1),
(2), (4) Date: Mar. 11, 2013

(87) PCT Pub. No.: WO2011/128110
PCT Pub. Date: Oct. 20, 2011

(65) Prior Publication Data
US 2013/0174969 A1    Jul. 11, 2013

(30) Foreign Application Priority Data
Apr. 16, 2010   (DE) .................. 10 2010 015 199

(51) Int. Cl.
*B29C 70/38*   (2006.01)
*B29C 70/54*   (2006.01)
*B29B 11/16*   (2006.01)

(52) U.S. Cl.
CPC ............... *B29C 70/541* (2013.01); *B29B 11/16* (2013.01); *B29C 70/382* (2013.01); *B29C 70/542* (2013.01); *Y10T 156/1002* (2015.01)

(58) Field of Classification Search
None
See application file for complete search history.

(56) References Cited

U.S. PATENT DOCUMENTS 4,404,156 A * 9/1983 Ogletree ................. B29C 70/16
                                                          264/162
4,432,716 A   2/1984 Kiss
(Continued)

FOREIGN PATENT DOCUMENTS

CN    101304859 B    4/2012
CN    101657575 B    8/2012
(Continued)

OTHER PUBLICATIONS

Unpublished U.S. Appl. No. 14/115,552.
(Continued)

*Primary Examiner* — Barbara J Musser
(74) *Attorney, Agent, or Firm* — J-Tek Law PLLC; Jeffrey D. Tekanic; Scott T. Wakeman

(57) ABSTRACT

A method of manufacturing a three-dimensional preform for a structural component made of a fiber composite material includes simultaneously laying a plurality of dry fibers on a workpiece carrier having a contour that corresponds to an intended three-dimensional shape of the preform and then fixing the fibers on an edge of the workpiece carrier. These steps are repeated in accordance with a predetermined fiber laying pattern until the three-dimensional preform has been completely formed. In addition, between each repetition, the fibers are cut beyond a segment of the fibers fixed on the edge of the workpiece carrier. After the three-dimensional preform has been completely formed, the three-dimensional preform is removed from the workpiece carrier and transferred to a subsequent manufacturing step. An apparatus configured to perform this method is also disclosed.

20 Claims, 19 Drawing Sheets

(56) References Cited

U.S. PATENT DOCUMENTS

| | | | |
|---|---|---|---|
| 4,679,291 A * | 7/1987 | Schmeal | B27F 7/006 |
| | | | 156/249 |
| 5,134,002 A | 7/1992 | Vallier | |
| 5,344,687 A | 9/1994 | Grimnes | |
| 5,645,677 A | 7/1997 | Cahuzac et al. | |
| 6,585,842 B1 | 7/2003 | Bompard et al. | |
| 8,580,060 B2 | 11/2013 | Bech | |
| 2005/0139324 A1 | 6/2005 | Meyer | |
| 2005/0268832 A1 | 12/2005 | Beneventi et al. | |
| 2006/0169396 A1 | 8/2006 | Joern | |
| 2009/0202789 A1 | 8/2009 | Wagner et al. | |
| 2009/0229760 A1 | 9/2009 | Hamlyn et al. | |
| 2010/0126652 A1 | 5/2010 | Joern et al. | |
| 2010/0170628 A1 | 7/2010 | Yoshikawa et al. | |
| 2010/0206994 A1 | 8/2010 | Barber | |
| 2011/0000608 A1 | 1/2011 | Bech | |
| 2011/0083605 A1 | 4/2011 | Vermilyea et al. | |
| 2011/0104364 A1 | 5/2011 | Chen | |
| 2011/0115124 A1 | 5/2011 | Barlag | |
| 2011/0148007 A1 | 6/2011 | Piepenbrock et al. | |
| 2012/0073730 A1 | 3/2012 | Nieuwenhove et al. | |
| 2012/0247651 A1 | 10/2012 | Nieuwenhove et al. | |
| 2013/0174969 A1 | 7/2013 | Karb et al. | |
| 2013/0175723 A1 | 7/2013 | Luebbering et al. | |
| 2014/0035195 A1 | 2/2014 | Goettinger et al. | |
| 2014/0041795 A1 | 2/2014 | Goettinger et al. | |
| 2014/0103571 A1 | 4/2014 | Karb et al. | |
| 2014/0131914 A1 | 5/2014 | Goettinger et al. | |

FOREIGN PATENT DOCUMENTS

| | | | |
|---|---|---|---|
| DE | 3003666 | | 8/1981 |
| DE | 3027655 A | | 9/1981 |
| DE | 4115831 | | 11/1992 |
| DE | 10005202 | | 11/2000 |
| DE | 19922799 A1 | | 11/2000 |
| DE | 10250826 | | 5/2004 |
| DE | 102008019147 | | 10/2009 |
| DE | 102010015199 A1 | | 10/2011 |
| EP | 0415870 A | | 3/1991 |
| EP | 0626252 | | 5/1994 |
| EP | 1584462 | | 10/2005 |
| EP | 1724098 A | | 11/2006 |
| EP | 2159310 | | 3/2010 |
| EP | 2314435 A2 | | 4/2011 |
| EP | 2433784 A1 | | 3/2012 |
| GB | 2452298 | | 3/2009 |
| JP | 3-287824 | | 12/1991 |
| WO | 03099545 | | 12/2003 |
| WO | 2008056980 | | 5/2008 |
| WO | 2009077581 A2 | | 6/2009 |
| WO | 2009124724 | | 10/2009 |
| WO | WO 2009127456 A1 * | 10/2009 | |
| WO | 2009158262 A1 | | 12/2009 |
| WO | WO 2010018229 A1 * | 2/2010 | B29C 33/16 |
| WO | 2011128110 A1 | | 10/2011 |
| WO | 2012035105 A | | 3/2012 |
| WO | 2012136391 A1 | | 10/2012 |
| WO | 2012136392 A1 | | 10/2012 |
| WO | 2012136393 A | | 10/2012 |
| WO | 2012136394 A | | 10/2012 |

OTHER PUBLICATIONS

English translation of Written Opinion for parent PCT application No. PCT/EP2011/001931.

English summary of DE 30 03 666 A1.

Office Action dated Dec. 9, 2010 from German Patent & Trademark Office in German priority application No. 10 2010 015 199.8-26 with English Translation of Substantive Portions.

Office Action dated Nov. 24, 2011 from German Patent & Trademark Office in German priority application No. 10 2010 015 199.8-26 with English Translation of Substantive Portions.

International Search Report for parent PCT application No. PCT/EP2011/001931.

Office Action mailed May 26, 2014 in counterpart Chinese Patent Application No. 201180019447.8, including English summary thereof.

Unpublished U.S. Appl. No. 14/394,182.

Extended European Search Report mailed Jun. 16, 2014 in related EP application No. 14161839.7, including European Search Opinion, European Search Report, and examined claims 1-8, as well as an English translation of examined claims 1-8.

* cited by examiner

Fig. 8
a) b)
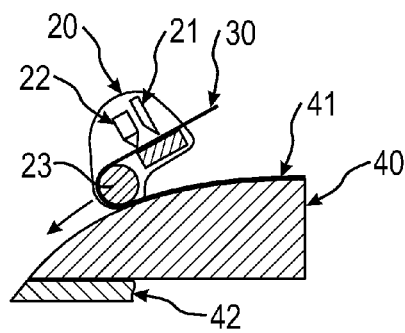 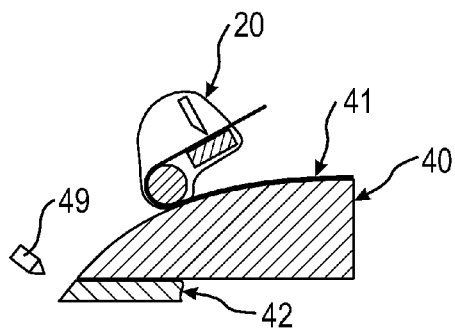
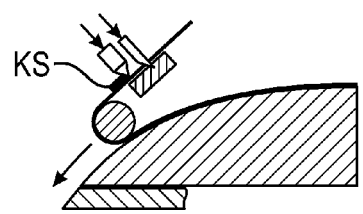 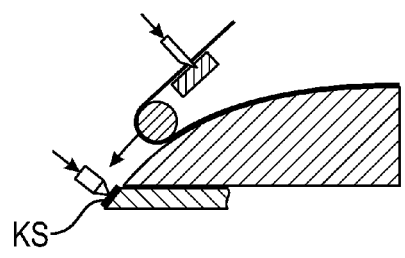
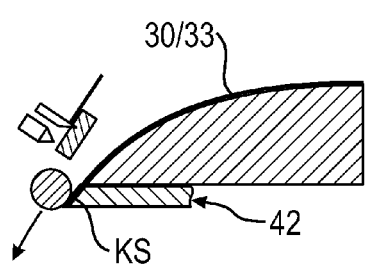 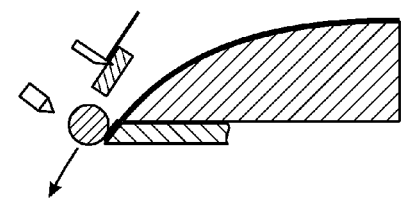

Fig. 10
a)
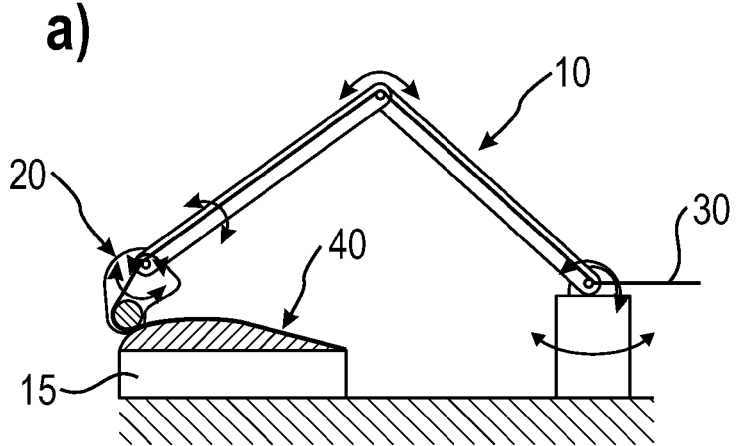
b)
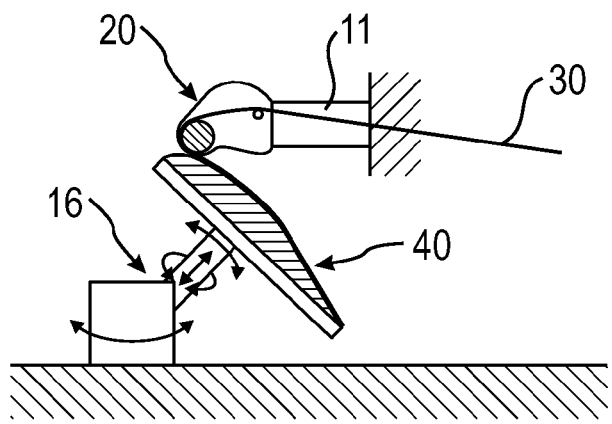
c)
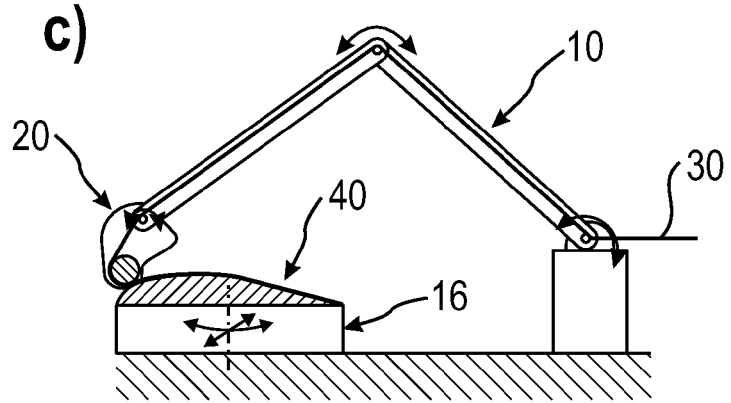

Fig. 15
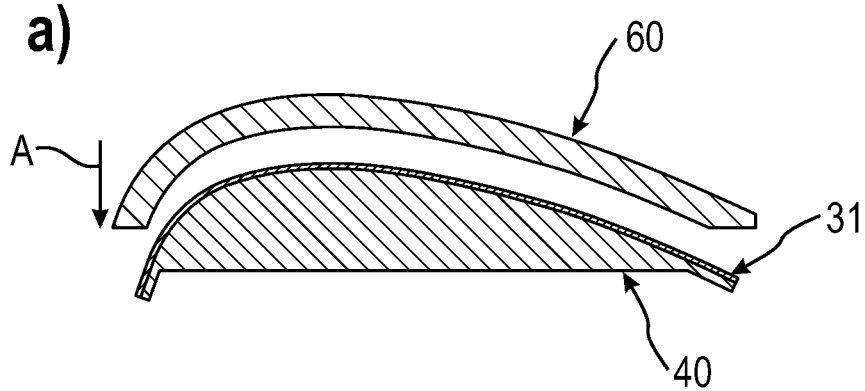
a)
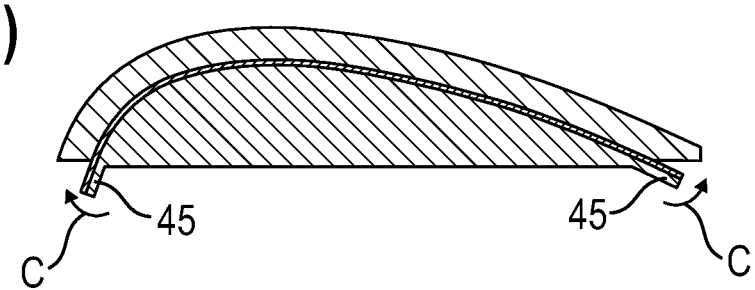
b)
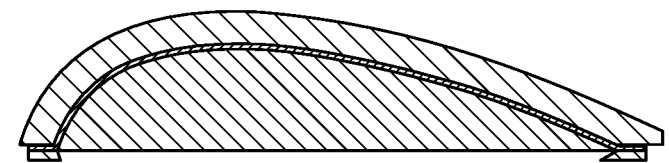
c)
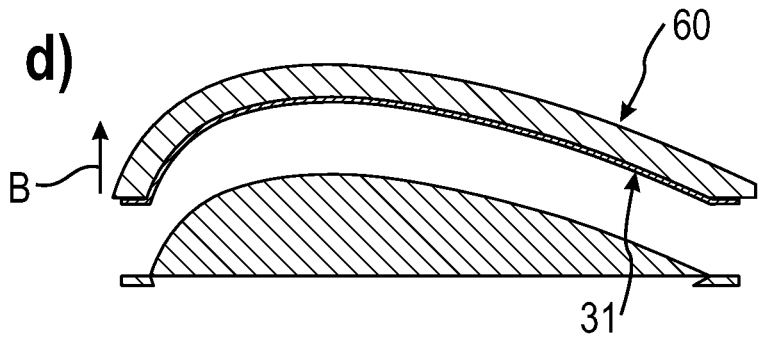
d)

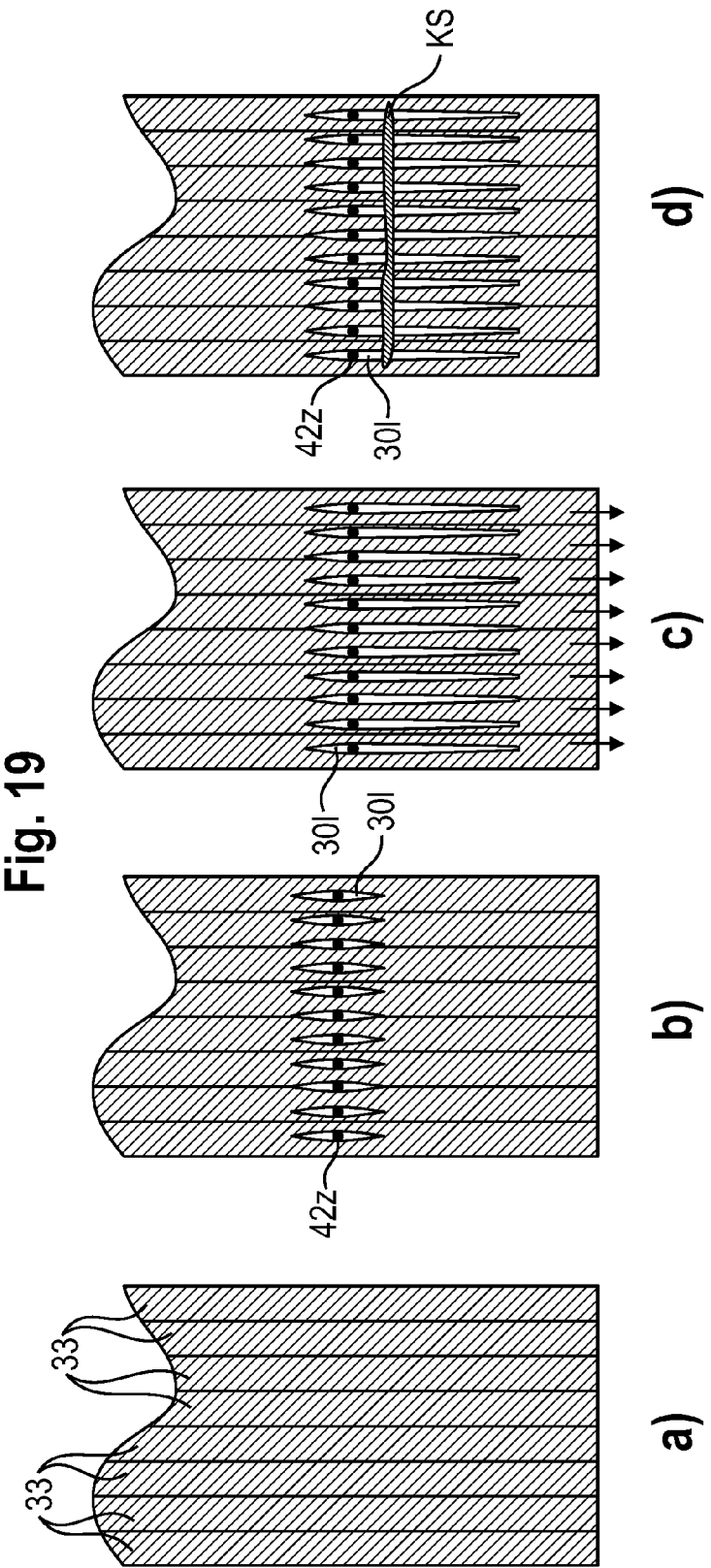

METHOD FOR MANUFACTURING FIBRE LAYERS

CROSS-REFERENCE

This application is the U.S. national stage of International Application No. PCT/EP2011/001931 filed on Apr. 15, 2011, which claims priority to German patent application no. 10 2010 015 199.8 filed on Apr. 16, 2010.

TECHNICAL FIELD

The present invention relates to an apparatus and to a method for manufacturing fiber layers and structural component preforms made of fibers as well as component parts of the same.

RELATED ART

Fiber composite materials are frequently used in lightweight structures due to their material characteristics. A plurality of different manufacturing methods exist for producing structural components made of fiber composite materials, which methods differ from each other in essence by the use of the semi-finished products (pre-manufactured raw material forms) processed therein. In the field of fiber composite materials, it is generally distinguished between semi-finished products that have been pre-impregnated with resin, also called prepreg which is derived from "pre-impregnated", and dry semi-finished products. The starting material for both types of semi-finished products for fiber composite materials is a so-called roving. A roving is a yarn consisting of a plurality of filaments made of the fiber material, which could be called the actual fibers. Carbon fibers, glass fibers, aramid fibers, etc. are preferably used as fiber composite materials. Such a roving can consist of several, such as e.g., 8 or 10 filaments, up to e.g., 50,000 or more filaments. In this application, the term "fiber" indicates a roving, except when reference is explicitly made to individual filaments.

The so-called prepregs can be manufactured in different ways. For example, dry semi-finished fiber products can be impregnated with a thermosetting resin which has a highly viscous, sticky consistency at room temperature. There are also semi-finished fiber products which are impregnated with a resin matrix of thermoplastic material. Both types will be called prepregs in this application.

These semi-finished products may exist as mostly parallel, unidirectional fibers, also called UD-prepreg, or as fabrics, also called fabric-prepregs.

For the dry semi-finished products, there are also different types in the prior art. In addition to woven fabrics, an important type of dry semi-finished products are the non-crimp fabrics, which usually exist as multi-axial fabrics (MAF) made of a plurality of superimposed layers of fibers having different orientations, which are held together, for example, by stitching or by means of an adhesive called a binder. Multi-axial fabrics can be manufactured unidirectionally (UD), biaxially, for example, in two layers, triaxially, for example, in three layers, quadriaxially, for example, in four layers, and so on, i.e. with a corresponding number of differently-oriented layers. Further dry semi-finished products are knit fabrics, braidings, interlaced fabrics, narrow band textiles and rovings. The rovings represent the starting material for all semi-finished products. The fiber composite material for a fiber composite structural component always comprises the two components, reinforcement fiber and matrix (resin). The two components, reinforcement fiber and matrix (resin), need to be joined in the manufacturing processes.

In case of the prepregs, i.e. in case of the semi-finished products having thermosetting or thermoplastic coatings, impregnations, etc., the reinforcement fiber and the matrix are present in an already mixed form. For the prepregs, after the shape-forming manufacturing steps that lead to the desired geometry of the structural component, the matrix is cured with temperature and/or pressure in an autoclave.

In the so-called performing, a preform is manufactured in the desired structural component geometry from dry semi-finished products. The impregnation with the, e.g., thermosetting resin is performed thereafter by using an injection method or an infusion method. In such a case, the resin is pressed under pressure into the dry semi-finished product, or it is infiltrated into the semi-finished product having the structural component geometry by using a partial vacuum.

Accordingly, three usual manufacturing methods for three-dimensional structural components made of fiber composite materials in the prior art can be distinguished. As the first, the preforming, in which a preform is built up in layers made of cut sheets of woven fabric and/or multi-axial fabric and is thereafter impregnated with resin in a mold and cured. The second, the manufacturing of the structural component from cut sheets of prepreg, which are placed in layers in a mold and are cured thereafter. The third, the fiber laying method, in which one or more fibers are laid, for example automatically, on a mold. In this case, prepreg fibers can be used, as is disclosed, for example, in U.S. Pat. No. 5,645,677 (corresponds to EP 0 626 252 A). It is also known in fiber laying methods to use dry rovings. The continuous fixing of the fibers on the mold is performed either by using binders or the fibers are impregnated with resin in the laying head immediately before being laid, as is disclosed, for example, in US 2009/0229760 A1.

A method for manufacturing a FCM/FCP structural component made of rovings using a molding tool and a molding tool for performing the method is known from WO 2009/124724 A1, wherein a roving is brought onto the molding-surface of the molding tool by stretching the roving using an application device under tension between deflection devices in predefined orientations. A non-crimp fabric for manufacturing a reinforcement of structural components consisting essentially of flat surfaces and a device for manufacturing the same are known from DE 30 03 666 A1, wherein a roving is deposited on an essentially plate-like surface and redirected via a yarn redirection element formed as a pin, bolt or the like. A method for manufacturing a preform for a structural part of an airplane made of a composite material is known from EP 1 584 462 A2, wherein a roving is deposited on a two-dimensional plane and is fixed between the start and the end point by stitching and the three-dimensional shape of the structural component is obtained through a subsequent forming step. A method for manufacturing of fiber-preforms for composite structural components is known from DE 10 2008 019 147 A1, in which dry fiber-rovings are deposited on a geometric contour, wherein in a method step before the deposition the dry fiber-rovings are provided with a binder, such as a thermoplastic binder, and are bound to the contour surface or to the already-deposited fiber-rovings by activating the binder. Thereafter, the fiber-rovings are cut using a cutting unit. DE 100 05 202 A1 discloses the manufacturing of semi-finished reinforcement structure products for fiber composite materials, wherein the preforms are punched or cut out.

SUMMARY

All these methods are not satisfactory with respect to the manufacturing of three-dimensional structural components of fiber composite materials. There are various disadvantages such as, for example, large proportions of cutting scrap of the original semi-finished products and/or large amounts of manual labor and/or low production speeds when using automatization and/or problems with the material storage and/or problems with the impregnation with the matrix.

Therefore, it is an object of the present teachings to provide improved techniques for the manufacture of three-dimensional preforms for structural components made of fiber composite materials.

In one aspect of the present teachings, a method for building up a three-dimensional preform for a structural component made of a fiber composite material, comprises:

a) providing a workpiece carrier corresponding to the three-dimensional shape of the preform;

b) laying a fiber set by simultaneously laying a plurality of dry fibers on the workpiece carrier, wherein the fibers are optionally intermediately fixed in at least one section;

c) fixing the fibers at, on or along the edge of the workpiece carrier;

d) repeating steps b) and c) according to a predetermined fiber set laying pattern for forming the three-dimensional preform, wherein, after each performance of step c), the raw fibers are cut behind the sections of the fibers fixed at the edge of the workpiece carrier and the next performance of step b) follows thereafter; and e) after completing the formation of the preform according to the predetermined fiber set laying pattern in step d), transferring the three-dimensional preform from the workpiece carrier to a next manufacturing step.

In another aspect of the present teachings, an apparatus for building up a three-dimensional preform for a structural component made of a fiber composite material, comprises:

a workpiece carrier having a form corresponding to the three-dimensional shape of the preform, a laying head configured to simultaneous lay a fiber set having a plurality of dry fibers on the workpiece carrier, an optional intermediate-fixing device configured to intermediate-fix at least one section of the fibers on the workpiece holder, an edge-fixing device configured to fix the fibers at, on or along the edge of the workpiece carrier, a fiber cutting device configured to cut the fibers, and a transfer device configured to transfer the three-dimensional preform from the workpiece carrier to a next manufacturing step.

In another aspect of the present teachings, a workpiece carrier for a three-dimensional preform for a structural component made of a fiber composite material, comprises:

a workpiece carrier comprising a workpiece forming area having a form corresponding to the three-dimensional shape of the preform and an edge-fixing area for fixing fibers of a laid fiber set.

In another aspect of the present teachings, a fiber-guiding device for guiding one or a plurality of fibers of a fiber set to be conveyed by a fiber conveying device, comprising:

an inlet, into which the fibers to be conveyed are introduced in a fiber-supply direction (V), an outlet, out of which the fibers to be conveyed are guided out in the fiber-supply direction (V), and a fiber-guiding chain, which connects the inlet with the outlet and in which the fibers to be conveyed are guided in the fiber-supply direction (V) via rotatably-supported shafts or via rollers, which are rotatably supported independently of each other.

BRIEF DESCRIPTION OF THE DRAWINGS

Further features and useful characteristics follow from the description of embodiments referring to the Figures. The Figures show:

FIG. 8 cross-sectional views of the laying, edge-fixing and cutting of fibers, in a) with an adhesive applicator integrated in the laying head and in b) with an external adhesive applicator for the edge-fixing;

FIG. 10 schematic views of different embodiments for realizing the relative movement of laying head and workpiece carrier;

FIG. 15 schematic representations in cross-sectional views of a second embodiment of a transfer device, which shows in a) to d) the removal of the perform from the workpiece carrier using the transfer device;

FIG. 19 a schematic representation of an embodiment of a technique for introducing gaps into rovings/fibers of a fiber set.

DETAILED DESCRIPTION OF THE INVENTION

At first, some general explanations will be given with respect to the taught devices and methods, before specific embodiments will be described.

It is possible with the taught devices and methods to lay dry fibers (rovings) in a fiber set on a workpiece carrier. The dry fibers are fixed in an edge area of the workpiece carrier provided therefor (edge-fixing) and, depending on the three-dimensional geometry of the preform to be produced, if necessary are intermediately fixed in predetermined intermediate-fixing areas.

This results in that dry fibers, which are significantly cheaper, can be used for the building up of the three-dimensional preform on the one hand and, due the laying of dry fibers, high supply speeds can be achieved on the other hand.

Various devices will be taught in the method for edge-fixing and for intermediate-fixing, which can be selected depending on the three-dimensional shape of the preform to be built up.

In order to be able to use the advantages of laying dry fibers in an advantageous way, various additional teachings for the supplying, conveying, cutting of fibers are given, which develop their combinatorial effects in connection with the laying of dry fibers and/or the edge-fixing and/or the partial intermediate-fixing. It is possible in this respect, for example, to reduce the tension on the dry laid fibers during the laying process with a relatively low mechanical or control effort. It is explicitly emphasized that the individual disclosed components, units, method steps are taught in combination as well as independent of each other, and moreover for the purpose of the disclosure as well as for the purpose of the disclosure of separately-claimable inventions. That means, for example, that the disclosure relating to the wear-free cutting of the fibers can be claimed in combination as well as separately and/or independently of the other teachings such as the fiber guiding via modified drag chains or the dry-laying of the fibers.

Figure 1:
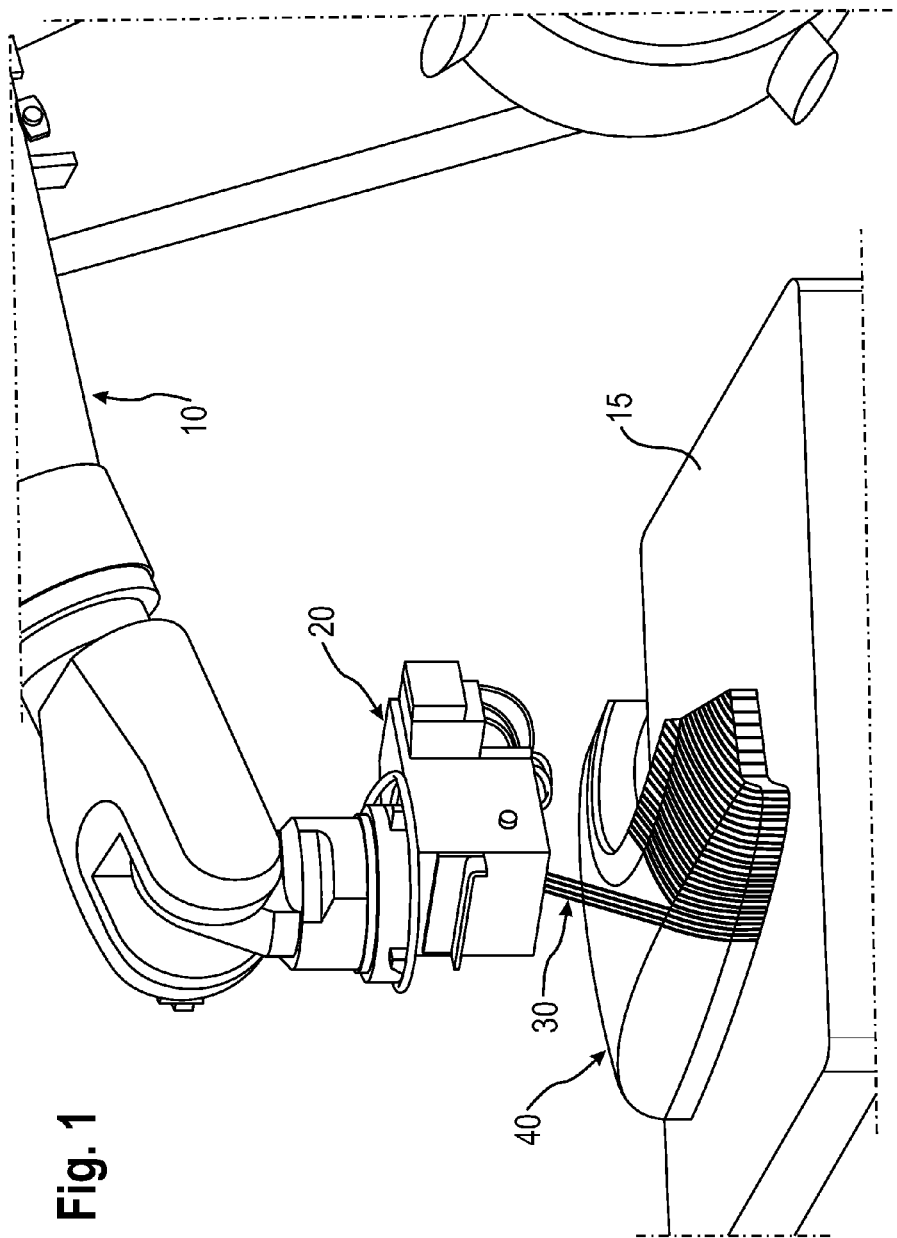
FIG. 1 a perspective view of a workpiece carrier and of a robot having a laying head according to the first embodiment of the invention.

FIG. 1 shows a robot 10, to which laying head 20 is attached. A workpiece carrier 40 is held on a support 15 for the workpiece carrier. It is shown schematically in FIG. 1 that the laying head 20 is adapted to lay a fiber set 30 on the workpiece carrier 40. In FIG. 1, only four fibers of the fiber set 30 are shown, which are simultaneously laid. The fiber set 30 can comprise a plurality n of fibers, where n=2, 3 . . . , wherein n=8 or n=16 or n=32 are presently preferred.

The arrangement serves to build up a three-dimensional preform for a structural component made of a fiber composite material with a multi-layer, multi-axial fiber architecture (MAFA) similar to a multi-axial fabric (MAF).

Figure 2:
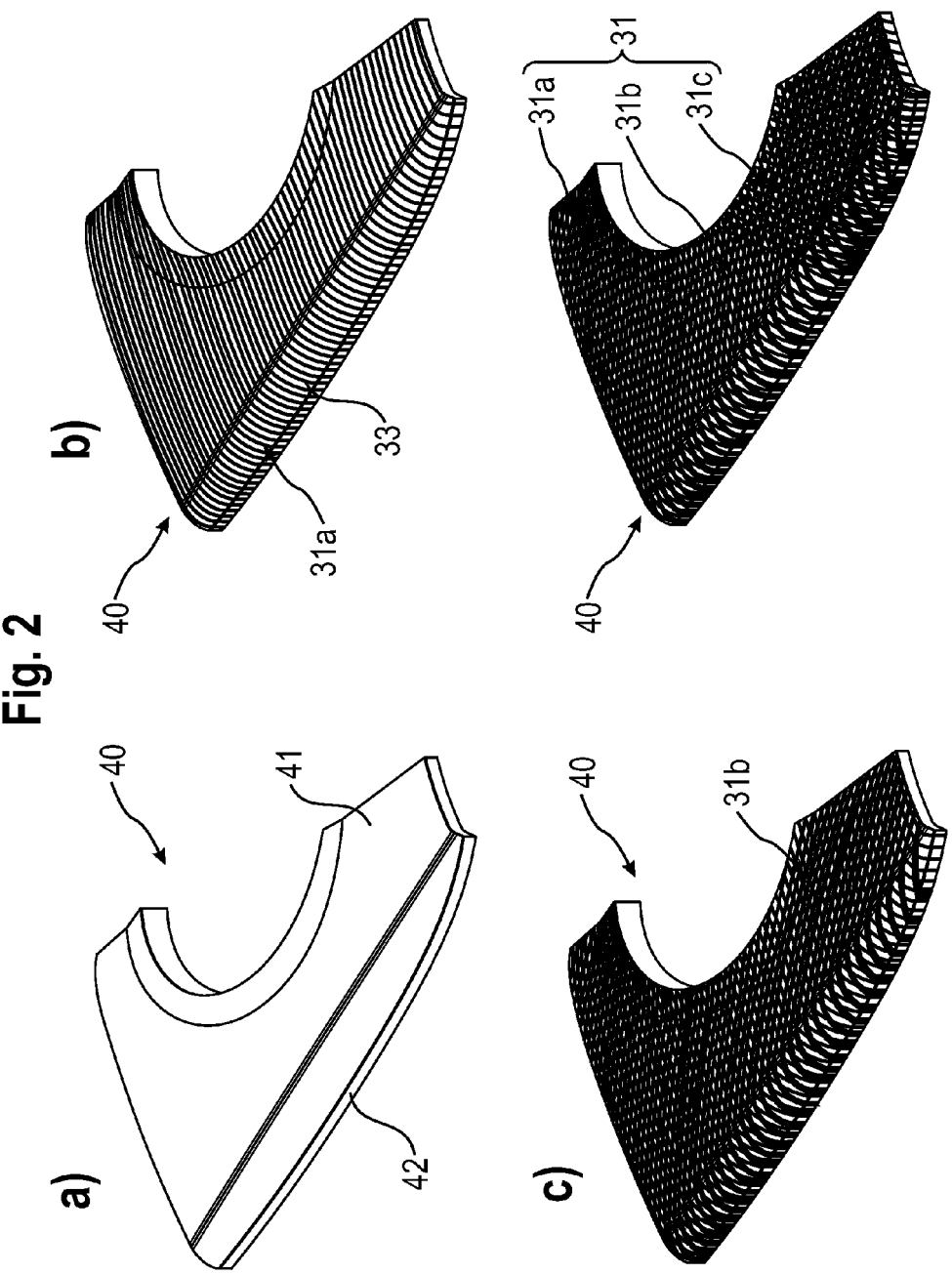
FIG. 2 in (a) a view of a workpiece carrier, and in (b), (c) and (d) with laid fiber layers.

As shown in FIG. 2a), the workpiece carrier 40 comprises a workpiece forming area 41 and an edge-fixing area 42 therefor. The workpiece forming area 41 corresponds to the desired three-dimensional shape of the preform. The edge-fixing area 42 serves to fix the dry-laid fibers 33 in the edge area of the workpiece carrier 40, as will be explained in further detail below.

In FIG. 2b), the workpiece carrier is shown with a first fiber layer 31a, which has been laid on the workpiece carrier 40 in a first orientation (=axial direction). As indicated in FIG. 2b), the fiber layer 31a consists of fibers (rovings) 33, which have been laid in this axial direction. In FIG. 2c), the same workpiece carrier 40 is shown, on which a second fiber layer 32b has been laid over the first fiber layer 31a. The fibers of the second fiber layer 31b have an orientation of −45° relative to the orientation of the first fiber layer 31a. It is shown in FIG. 2d) how a third fiber layer 31c has been laid over the second fiber layer 31b, wherein it has been laid only on a part of the workpiece carrier 40. The third layer 31c has an orientation of +45° relative to the first layer 31a and thus of 90° relative to the second layer 31b. The three layers 31a to 31c form a multi-layer, multi-axial fiber architecture (MAFA) 31.

Figure 3:
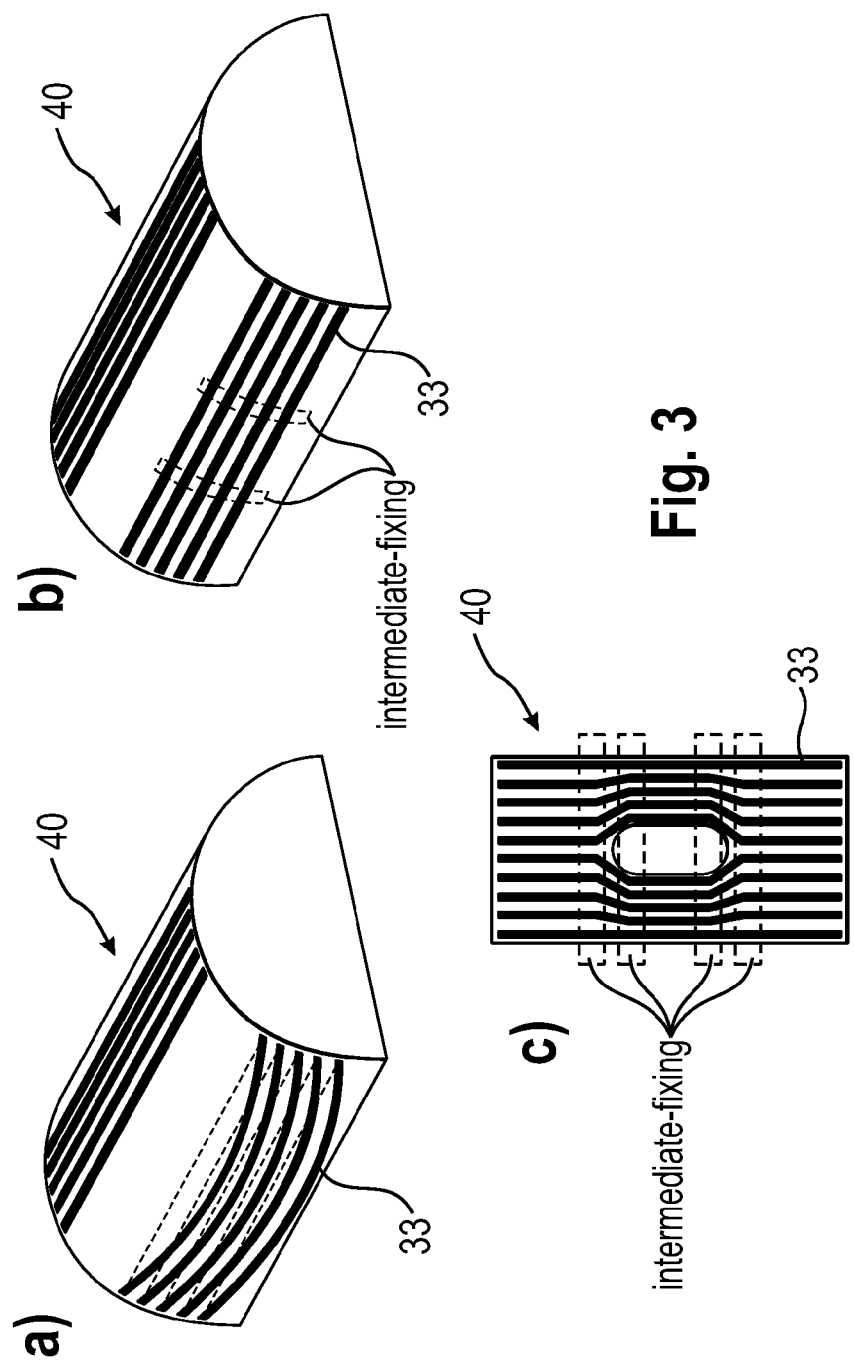
FIG. 3 in (a) a workpiece carrier with fibers laid thereon without intermediate-fixing and in (b), and (c) a workpiece carrier with fibers laid thereon with intermediate-fixing areas according to embodiments of the invention.

As was already explained, the fibers 33 are laid dry onto the workpiece carrier 40. With the workpiece carrier shown in FIG. 2, it follows that this could lead to difficulties on the protruding curved portion. Something similar could happen in a situation as shown in FIG. 3a). There, a workpiece carrier 40 is shown, whose shape essentially corresponds to a circular cylinder cut in the middle in the axial direction. When dry fibers are laid, which are fixed only in the edge area of the workpiece carrier 40, the fibers could slide down, as is shown in FIG. 3a).

For this reason, an intermediate-fixing of the dry laid fibers is undertaken at such critical locations. An example for such an intermediate-fixing is schematically shown in FIG. 3b). In FIG. 3c), a plan view of a workpiece carrier is shown, which is shaped like the workpiece carrier shown in 3a), which, however, comprises a projection protruding on its upper side, around which the fibers 33 are to be laid. As directly follows from FIG. 3c), an intermediate-fixing of the dry laid fibers should be undertaken in this area.

Figure 4:
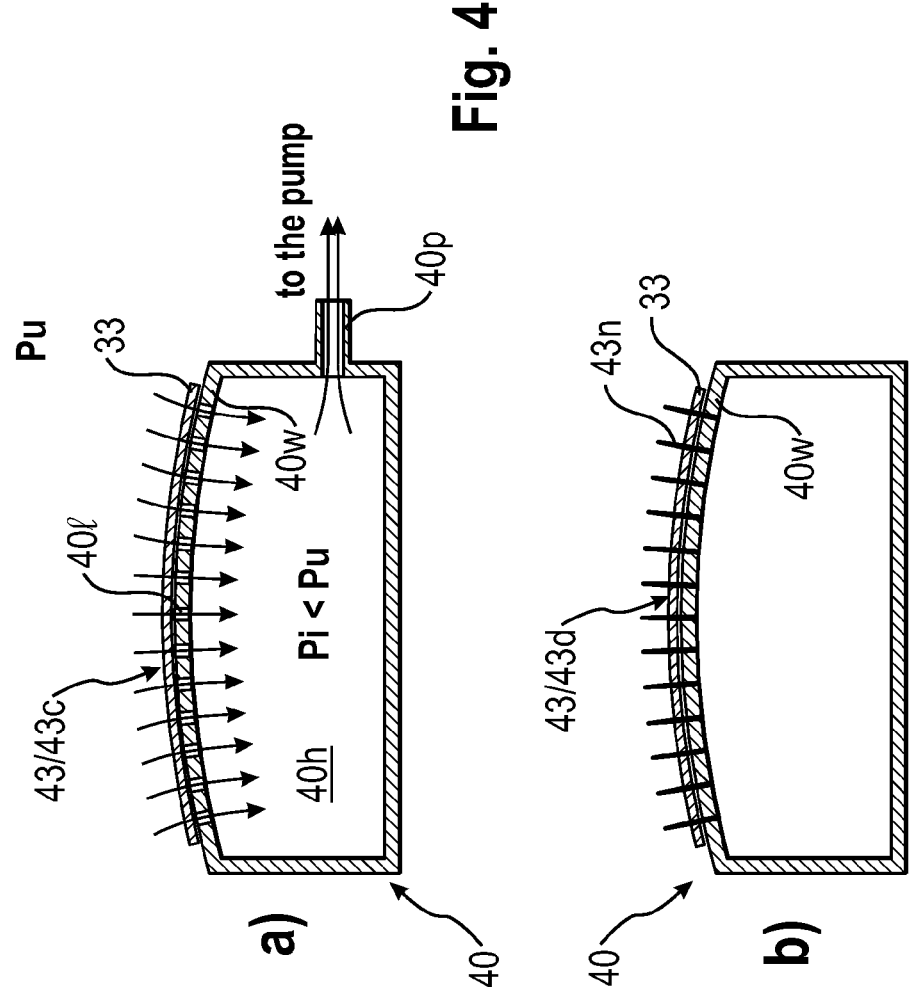
FIG. 4 embodiments of workpiece carriers with intermediate-fixing areas in cross-sectional views, in (a) with suction intermediate-fixing areas and in (b) with needle intermediate-fixing area.

In FIG. 4, first embodiments for providing such intermediate-fixing areas are shown. In FIG. 4a), a cross-sectional view of a workpiece carrier 40 is schematically shown, which carrier 40 has a hollow inner space 40h. The hollow inner space 40h can be connected to a pump via a pump connector 40p. Through-holes 401 are formed in the wall 40w, on which wall 40w the fibers 33 are to be laid. The inner space 40h is held at a pressure pi, which is lower than the ambient pressure pu, by connecting a suction pump. As a result, a reduced pressure or a suction effect results on the outer side of the wall 40w so that the laid fibers 33 are intermediately fixed in this edge-fixing area, which is formed as a reduced pressure/suction area 43c. Another embodiment of an intermediate-fixing area 43 is shown in FIG. 4b), which is formed as a needle area 43d. In this needle area, needles 43n project on the outer side of the wall 40w, and the fibers 33 are intermediately fixed by the needles 43n.

Other designs of intermediate-fixing areas, for example as areas for applying an adhesive or for providing hooks or for freezing the fibers, are also possible.

Figure 5:
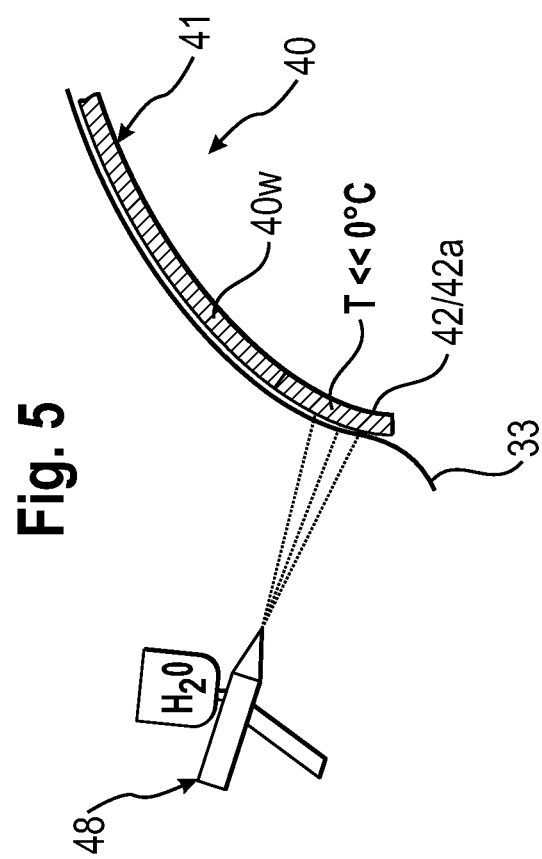
FIG. 5 a partial, cross-sectional view of an embodiment of a workpiece carrier with a freezing edge-fixing area.

Appropriate fixing possibilities are also provided for the edge-fixing area 42. In FIG. 5, a partial cross-sectional view of a wall 40w of a workpiece carrier 40 is shown. The edge-fixing area 42 is formed connecting to the workpiece forming area 41. It is held at a temperature, which is significantly lower than the freezing point of a fixing medium (for example water). Here, significantly lower means a temperature difference of 10K or more, in case of water approximately 30K. The cooling of the fixing area can be achieved, for example, by flowing a cold, liquid cooling medium through cooling channels in the fixing area. In this respect, the usual refrigerants and cooling agents used in cooling systems of the same temperature range can be used.

Using a spray nozzle 48, the liquid, low viscosity fixing medium is sprayed onto the location, at which the fibers 33 are to be fixed in the edge-fixing area 42. Due to the large temperature difference, the fixing medium immediately freezes and thereby the fiber 33 to be fixed is immediately frozen on the freezing area 43b. This fixing method is, of course, as was already described, also applicable to the intermediate-fixing. Fixing media, which are not low viscosity at room temperature, need to be supplied hot to the spraying nozzle.

In FIG. 6a), an edge-fixing of fibers 33 using a mechanical clamp is shown. Holding elements 42h are provided in the edge-fixing area 42 for this purpose, which holding elements 42h apply a clamping force perpendicular to the edge-fixing area and thus clamp the fibers 33. The clamping force can be generated by a kinematic system that is driven pneumatically, electrically or hydraulically, or, for example, also by use of magnetic clamping elements, which are attracted to the edge-fixing area 42.

When using magnetic clamping elements, they are removed by a manipulator on either the laying head or on the workpiece carrier or by another manipulator (e.g., a robot) before the deposition of the fiber set, and they are again attached after the fiber set has been placed in the clamping area. Alternatively, for example, controllable electromagnets could be provided in the edge area.

In the mechanical clamping system shown in FIG. 6a), two rows of holding elements 42h, which extend spaced apart and essentially parallel to each other along the edge-fixing area 42, are used.

An alternative embodiment of a mechanical clamping system for the edge-fixing area is shown in FIG. 6b). There, two rows of clamping hooks 42k are used. The clamping hooks could be moved upwards out of the plane of the edge-fixing area and turned there, which is not shown, so that the fibers 33 are laid in a dry state and then clamped by turning and pulling down the hooks 42k. The clamped state is shown in FIG. 6b).

In FIG. 7a), an embodiment of the edge-fixing area 42 is shown, in which needles 42n protrude from the edge-fixing area 42. In FIG. 7b), an embodiment is again shown, in which hooks 42k are used for the edge-fixing.

Figure 6:
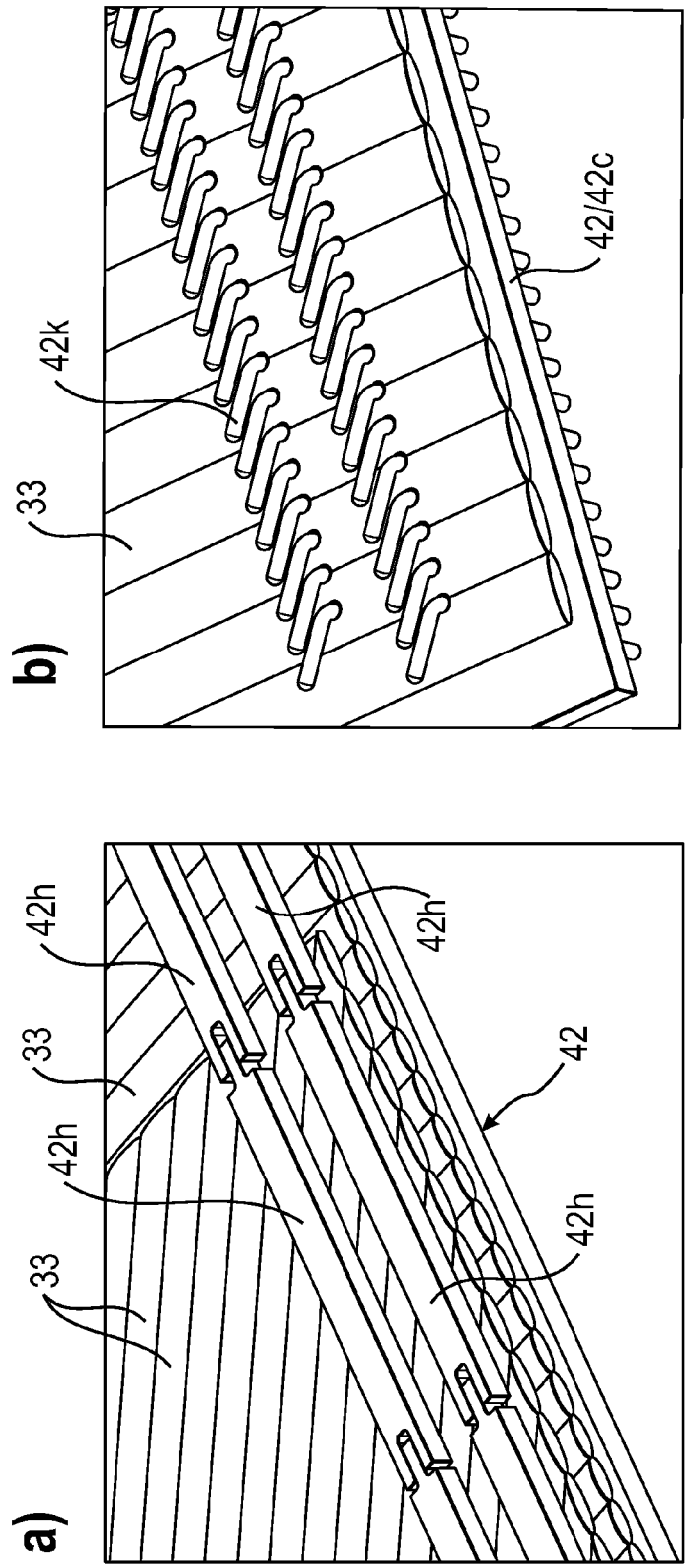
FIG. 6 embodiments of edge-fixing areas of a workpiece carrier, in a) as an edge-fixing area with mechanical clamps (kinematic system of the clamping device not shown) and in b) as a hook edge-fixing area.
Figure 7:
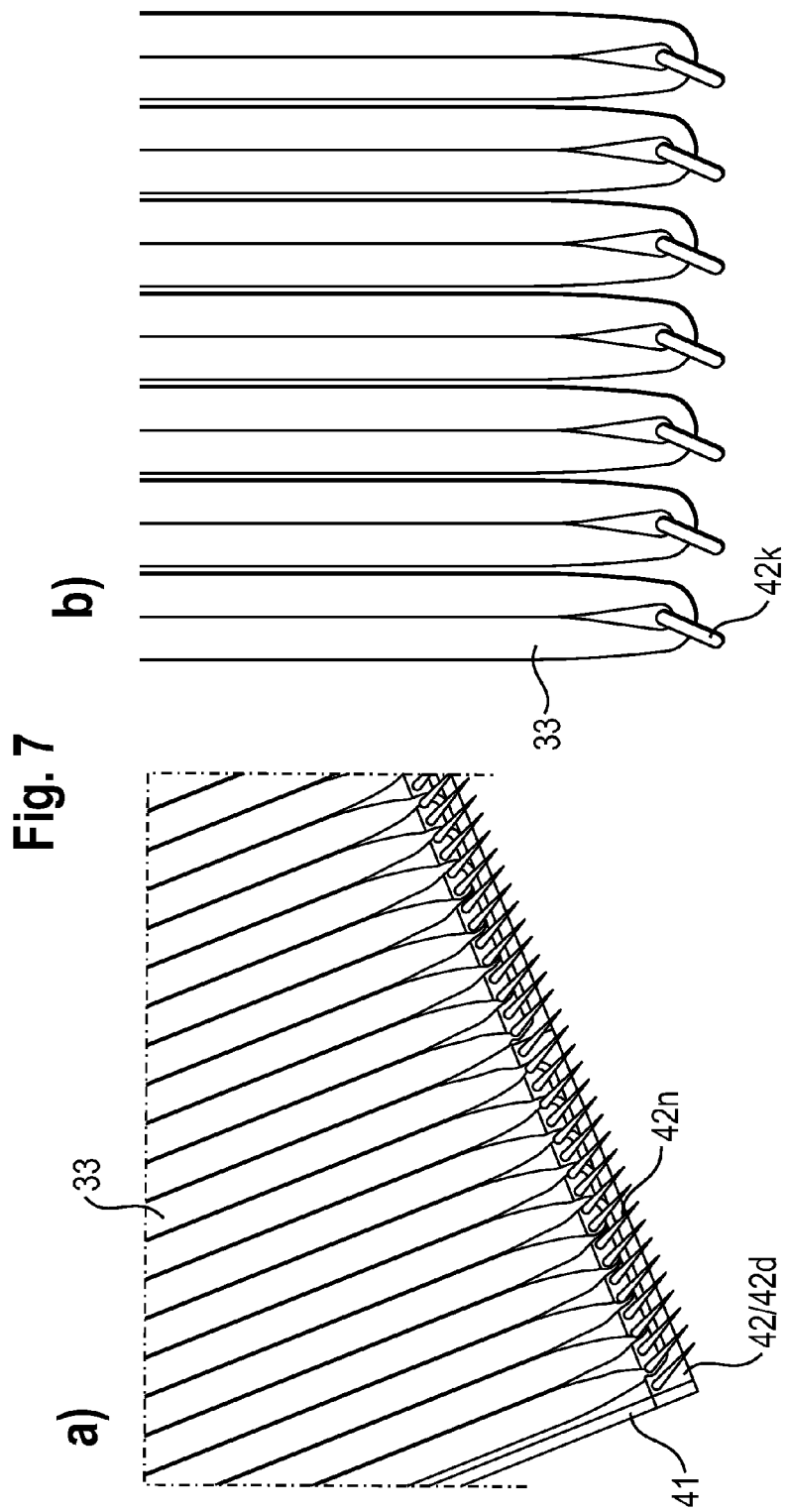
FIG. 7 embodiments of edge-fixing areas of a workpiece carrier, in a) as a needle edge-fixing area and b) as a hook edge-fixing area.

In FIG. 6, the use of the edge-fixing area is shown such that the fibers 33 are cut after the edge-fixing. In FIG. 7, on the other hand, the use of the embodiments of the edge-fixing areas is shown such that the fibers are not cut after the edge-fixing, but rather the fiber set laying pattern is continued without cutting the fibers at this location.

It is schematically shown in FIG. 8 how edge-fixing using adhesive KS is obtained in the edge-fixing area 42 while using the workpiece carrier 40 and the laying head 20. In FIG. 8a), the process flow is shown from the top to the bottom with a laying head 20 having an integrated adhesive nozzle 22. The fiber set 30 is supplied from the right top side into the laying head 20 and is laid onto the workpiece carrier 40 via a pressing/redirecting roller 23. The dry fibers 33 of the fiber set 30 are thereby laid onto the workpiece form area 41. The laying head 20 comprises an integrated cutting mechanism 21, with which the fibers 33 of the fiber set 30 can be cut. Details of such cutting mechanisms will be explained further below.

In the second view in FIG. 8a), a position is schematically shown, in which the lengths of the fiber from the current depositing point on the workpiece carrier 40 up to the cutting mechanism corresponds to the remaining deposition length up to the end of the edge-fixing area 42. In this position, the fibers 33 of the fiber set 30 are cut by operating the cutting mechanism 21, as is schematically indicated by the arrow. Adhesive KS is applied to the corresponding end of the fiber through the integrated adhesive nozzle 22 in a corresponding length so that, after a further movement of the laying head 20 into the position, which is shown in FIG. 8a) bottom, the cut fibers 33 of the fiber set 30 are fixed in the edge-fixing area 42 by the adhesive KS applied only in a segment thereof.

In FIG. 8b), essentially the same process flow is shown for an embodiment, in which the adhesive nozzle is provided as an external adhesive nozzle 49 instead of the internal adhesive nozzle 22. Thus, the adhesive is not applied onto the fibers 33 of the fiber set 30, but rather is applied onto the corresponding portion of the edge-fixing area 42.

Figure 9:
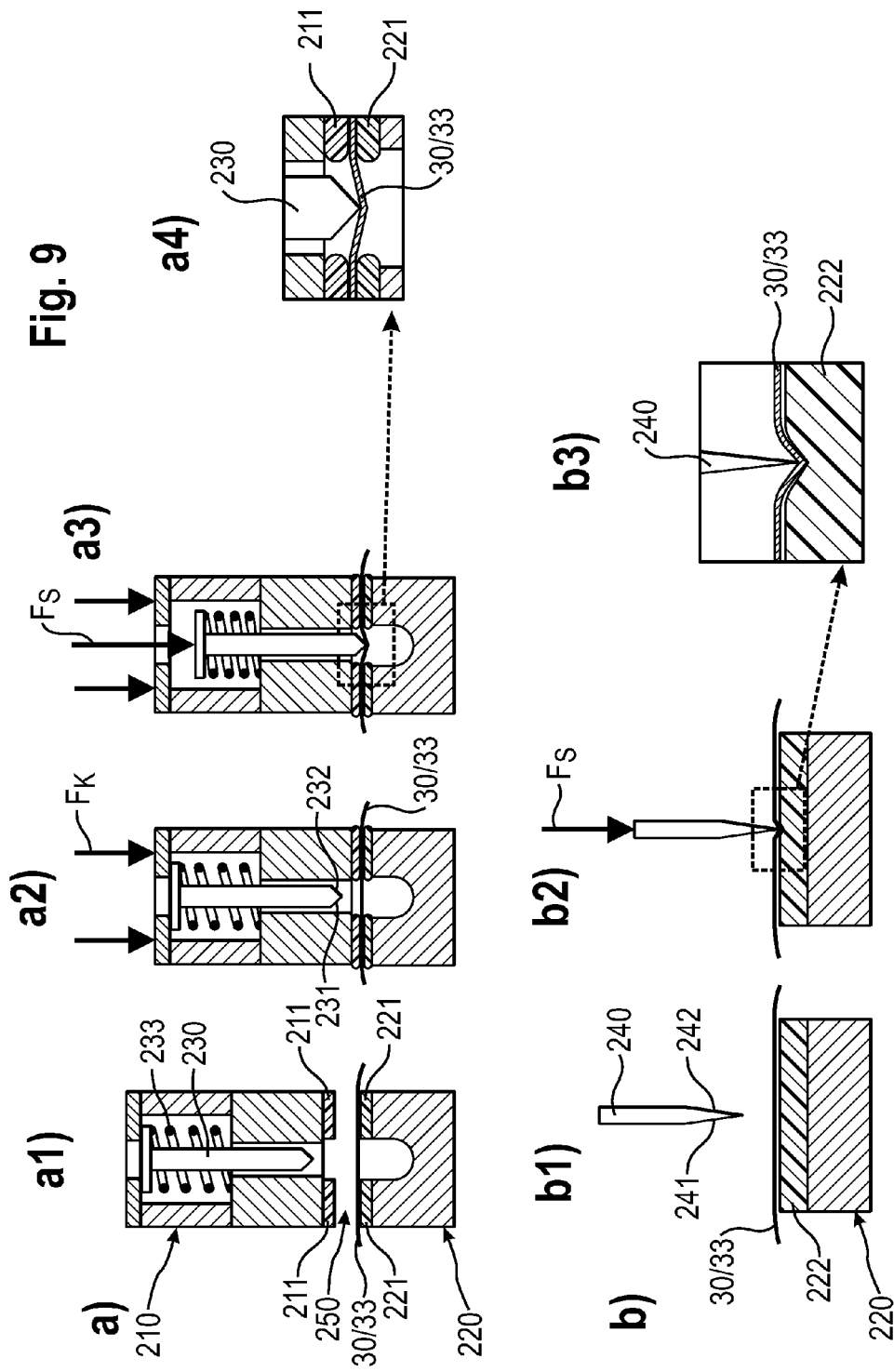
FIG. 9 embodiments of fiber cutting mechanisms.

In FIG. 9, a first embodiment of cutting mechanism 21 for the laying head 20 is shown in a). The cutting mechanism 21 comprises a pusher 210 and an abutment 220. In a pass-through position, the pusher 210 and the abutment 220 are spaced from each other. In this position, a fiber channel or a fiber passage 250 is formed between the pusher 210 and the abutment 220. The fibers 33 can be conveyed in a fiber supply direction V through this fiber passage 250 during the laying process (see FIG. 8). The pusher 210 is moveable relative to the abutment 220 perpendicular to the fiber supply direction, as follows from a comparison of views a1) and a2). On the sides delimiting the fiber passage 250, the pusher 210 and the abutment 220 comprise clamping jaws 211, 221. A cutting blade 230 is provided in the pusher 210 such that it is moveable in a direction perpendicular to the fiber supply direction V. The cutting blade 230 is biased by a spring 233 in the direction away from the fibers 33. To cut a fiber 33, the pusher 210 is moved towards the abutment 220 by a not-shown actuator and pushed against the abutment with a clamping force $F_K$ and the fiber to be cut is clamped between the clamping jaws 211, 221 with this clamping force. This state is shown in view a2). Then, the cutting blade 230 is pushed with a cutting force Fs against the fiber to be cut and against the biasing force of spring 233 by an actuator and the fiber clamped between the clamping jaws 211. 221 is cut or broken. In the embodiment shown, the cutting blade 230 comprises cutting edge flanks 231, 233, which extend at an angle of approximately 90° relative to each other. That means, the cutting edge angle is 90° (the preferred value from a range of 45° to 120°). The cutting operation of a fiber 30 and such a "blunt" cutting edge is called stretch-breaking. Thereby, the fiber is bent over an edge, i.e. the cutting edge, under high tension. Due to the combination of tension stress and bending stress and the brittleness of the material of the fiber, the fiber breaks. This cutting method is only suitable for brittle fibers such as carbon fibers or glass fibers. The advantage of the large cutting edge angle is in that the cutting edge/breaking edge is very robust as a result and the wear is extraordinarily low. No relative movement between the cutting edge and fiber is required. No counterface for the cutting, which could damage the breaking edge, is required. The actual process of stretch-breaking is shown in an enlarged view in view a4), as indicated by the dashed box in view a3).

It is obvious that, due to the clamping of the fiber between the clamping jaws 211, 221, both the stretch-breaking is facilitated and the transmission of tension stress to the fibers 33 of a fiber set is prevented.

The principle of a cutting mechanism 21 for stretch-breaking schematically shown in FIG. 9a) can be implemented in different embodiments. Already mentioned were separate drives for the pusher 210 and the cutting edge 230, which can be mechanical or hydraulic or pneumatic drives or combinations of pneumatic, mechanical or hydraulic drives of the two elements. Alternatively, the pusher 210 could be stationary and the abutment 220 could be moved towards the pusher 210. Alternatively, it is also possible to only accelerate the pusher 210 or the cutting edge 230 for the movement and to support the other element thereon in a spring-biased manner. For example, the pusher 210 can be accelerated pneumatically, and the cutting edge 230 is supported in a spring-biased manner in the pusher 210. With an appropriate matching of the mass of the cutting edge 230 and the spring force of the spring 233, the cutting edge is moved against the spring force of the spring 233 due to its inertia when the pusher 210 hits the abutment 220. Using this principle, it is also possible to move the cutting edge 230 and to provide a correspondingly strong spring 233, which then leads to an entrainment of the pusher 210. Then, when the pusher 210 has come into contact with the abutment 220, the cutting edge 230 is moved further against the force of spring 233 for stretch-breaking.

Another embodiment of the cutting mechanism 21 is shown in FIG. 9b), in which the principle of bend-breaking is implemented. Thereby, the fiber is pushed against an elastic base 222, which is attached on the abutment 220, with a sharper cutting edge, i.e. with a significantly smaller cutting angle than for the stretch-breaking. Thereby, the base is formed around the cutting edge by the indentation of the cutting edge. The fiber present between the cutting edge and the base is bent around the small cutting radius of the cutting edge. Due to the brittleness of the fibers, they break even with small pressing forces of cutting edge onto base. The cutting edge and the base do not wear, or only to a low degree, when the cutting force is limited to the just-required amount, because also in this case no relative movement between cutting edge, base and fibers to be cut occurs, through which an abrasive wearing could be generated. The cutting edge 240 can again be moved pneumatically, hydraulically, mechanically, etc.

FIG. 10 shows different possibilities of generating the relative movement of laying head 20 and workpiece carrier 40. In the embodiment shown in FIG. 10a), the workpiece carrier 40 is held on a stationary support 15 for the workpiece carrier. The robot 10 moves the laying head 20 during the laying of the fiber set.

Vice versa, a manipulator 16 for the workpiece carrier 40 could be provided (FIG. 10b)), which moves the workpiece carrier relative to the laying head 20, which is supported at a laying head support 11. Of course, a combination of robot 10 and manipulator 16 is also possible, as is shown in FIG. 10c).

Figure 11:
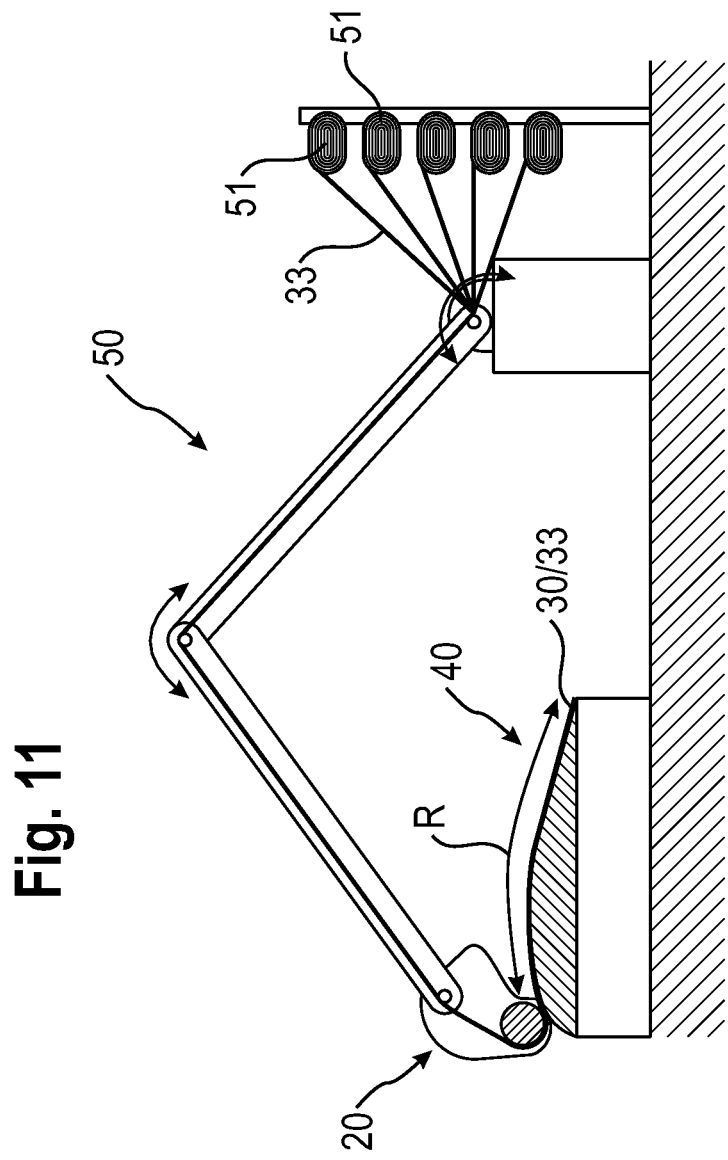
FIG. 11 a schematic view for explaining the fiber supply.

In FIG. 11, it is schematically shown how the fibers 33 for the fiber set 30 are supplied during the laying process. The fibers (rovings) 33 are wound on bobbins 51 of a fiber supplying mechanism 50 and they are supplied from there via parts of a fiber supplying mechanism 50, which will be described in more detail, to the laying head 20. During the relative movement R of the laying head 20 and the workpiece carrier 40, different supplying speeds and tension forces can occur in the fibers 33. Due to the arrangement of the redirecting positions of the fiber-supplying mechanism at the joints of the manipulator system, it is possible to keep constant the distance of the fiber set from the bobbin to the laying head. A loosening and sagging connected therewith of the fiber set during movements of the manipulator system is thereby avoided.

Figure 12:
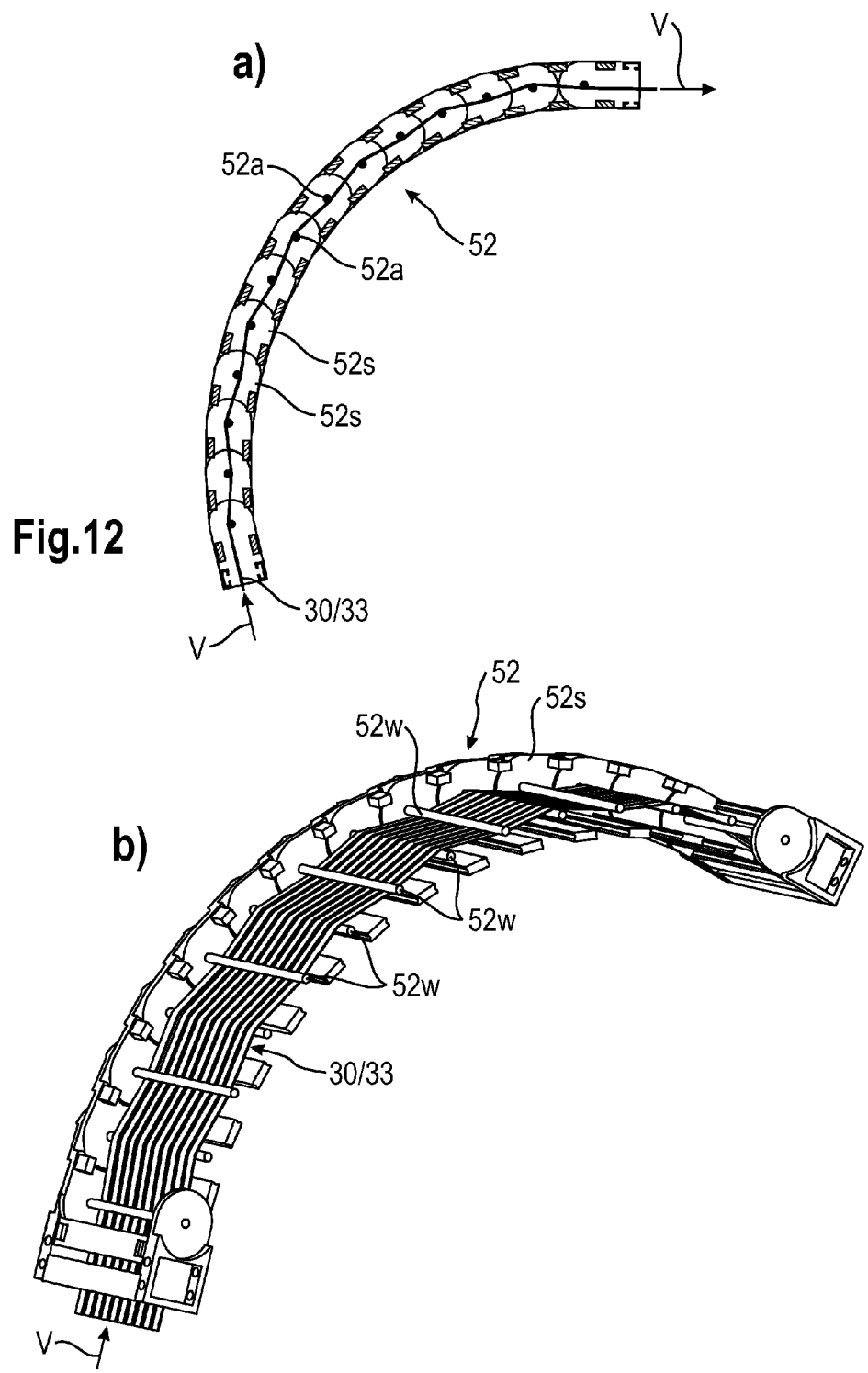
FIG. 12 a first embodiment of a modified drag chain for the fiber guiding in a) in a cross-sectional view and in b) in a partially cut-away perspective view.

FIG. 12 shows a first embodiment of a fiber guiding mechanism 52 of a fiber supply mechanism 50. The fiber guiding mechanism 52 is implemented in form of a modified drag chain, which represents a type of fiber guiding chain. Drag chains are known in the machine art in order to guide flexible cables or pneumatic or hydraulic lines, which are connected to a constantly-moving machine part.

For the fiber-guidance of the fiber set, a fiber guiding chain, which consists of a plurality of segments that are pivotable relative to each other, is used that can be manufactured, for example, by modification of a drag chain. The drag chain is modified in the manner that rotatably-supported shafts guide the fibers, as is shown in FIG. 12.

Such a fiber guiding chain 52 comprises chain segments 52s. Adjacent chain segments 52s can move relative to each other rotating around an axis 52a. That means that the spacing of two adjacent axes 52a is held constant. In the modified drag chain, rotatably-supported shafts 52w are put on each axis 52a. That means the rotatably-supported shafts 52w extend along the axial direction of the axes 52a. In a side view, as is shown in FIG. 12a), the fibers 33 pass over the shafts 52w in the fiber supply direction V, regularly alternating left and right of the shafts 52w. That means, in a plan view onto the fiber set 33, that the fiber set 33 is guided in the fiber supply direction V, alternating below and above the shafts 52w.

As a result, the spacing of the adjacent shafts 52w is constant when the fiber guiding chain 52 bends such that essentially no tension force is applied to the guided fibers 33 and/or the fiber set 30 due to a movement of the fiber guiding chain. Due to the guiding via rotatably-supported shafts, the friction forces occurring, e.g., in case of guidance through pipes, do not apply. As a result, a lower force for drawing the roving set is necessary and the fibers are guided without damage.

By using fiber guiding chains, which also allow a torsion around the longitudinal axis of the chain, the fibers can be three-dimensionally guided in space. In addition to the guiding of individual or of a plurality of fibers, this embodiment of a fiber guiding chain also makes possible the guiding of band-like textile reinforcements such as narrow band textiles and web bands.

Figure 13:
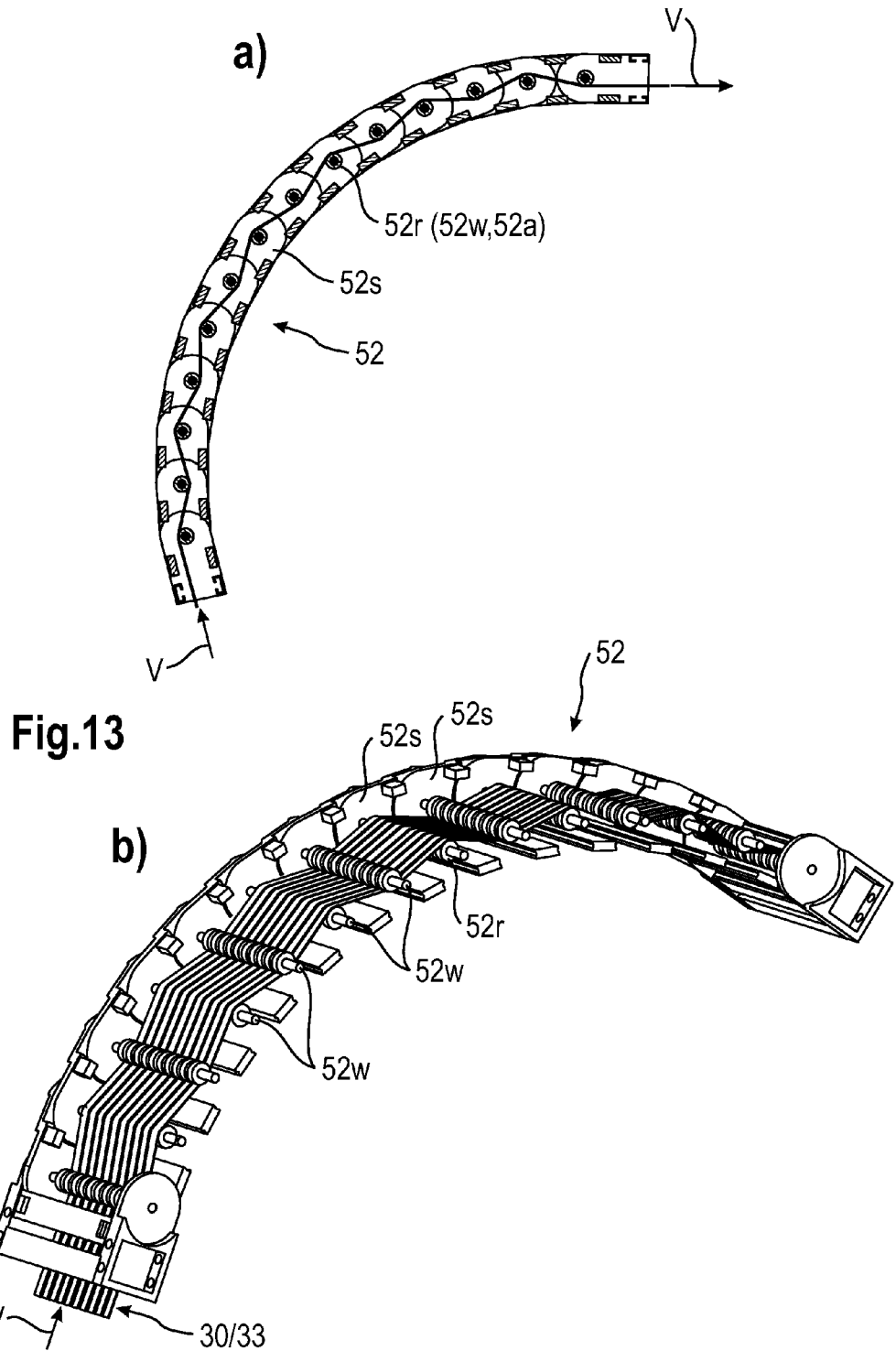
FIG. 13 a second embodiment of a modified drag chain for the fiber guiding, in a) in a cross-sectional view and in b) in a partially cut-away perspective view.

FIG. 13 shows a second embodiment of a fiber guiding chain. The second embodiment differs from the first embodiment in that separate rotatably-supported rollers 53r for the fibers (rovings) 33 are provided on the shafts 52w. Due to this arrangement, it is possible to convey each fiber with independent speeds through the fiber guiding chain.

The laying head 20 comprises a not-shown fiber conveying device. The fiber conveying can be implemented, for example, with a conveying unit as described in US 2009/0229760 A1.

In principle, a fiber conveyance according to the Eytelwein principle is known. This Eytelwein principle has been used for a long time in stitching and embroidery machines for fiber-composite materials. The fiber conveying mechanism serves to compensate the fiber forces generated due to friction in the fiber guidance and/or the fiber supply. In such a conveying mechanism according to the Eytelwein principle, the fibers run over two rows of rollers, which are arranged parallel to each other and are offset. As long as the rovings are essentially free of tension, the rollers rotate underneath the rovings without conveying the same, i.e. with slippage. When tension forces are applied to the rovings, which forces are generated, for example, at the redirection rollers and the like, the fibers are conveyed by the rotating rollers.

A device for preparing the fibers (rovings) optionally can be provided in the laying head. In this fiber preparing device (not shown), the fibers can be brought into a defined width by spreading (preparation). Furthermore, all fibers can be brought together into a unitary, homogenous band of defined width (homogenization). The goal is, in this case, that no gaps occur between the fibers of a fiber set and also no overlaps occur between the fibers of the fiber set. Of course, it is also possible to intentionally generate gaps or overlaps in case of the opposite goal. The width of the fiber set at the outlet of the laying head can be varied by the fiber preparing device, and a variation of the area density of the fiber set becomes possible.

The fiber preparation can be effected by rollers, rolls, pins and the like. That is, a fiber treatment device is provided, which can bring the fibers of the fiber set into a defined width and/or can vary the spacings of the fibers of the fiber set.

Figure 14:
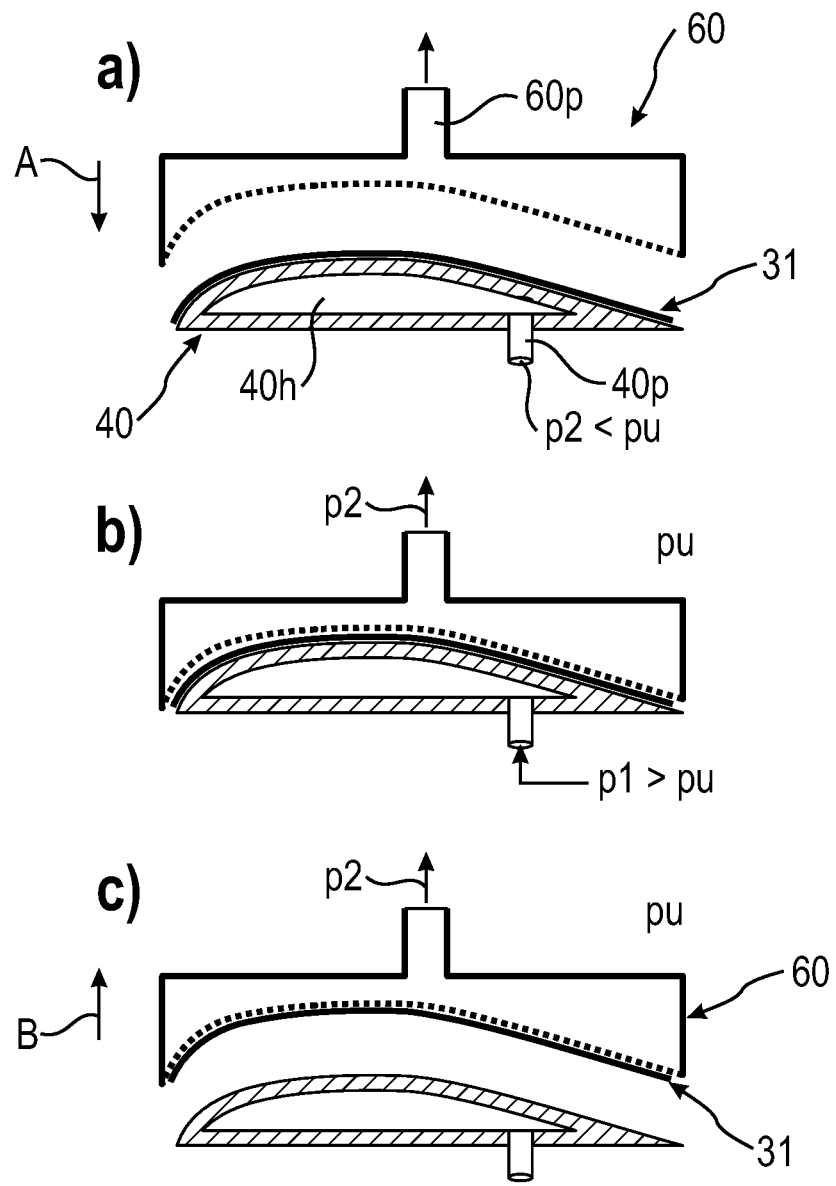
FIG. 14 schematic representations in cross-sectional views of an embodiment of a transfer device, which shows in a) to c) the removal of the preform from a workpiece carrier using the transfer device.

In FIG. 14, the execution of the transfer of a built-up preform from the workpiece carrier to the subsequent process step is schematically shown. The workpiece carrier 40 is, in the shown embodiment, formed with a hollow inner space 40h, and the inner space 40h can be connected to a pump or a pressure source via a connector 40p. The preform 31 in form of a MAFA has been built up by laying plural fiber sets according to a fiber laying pattern.

In the embodiment shown in FIG. 14, for example, intermediate-fixing areas 43, which operate using reduced pressure p2, are provided.

The transfer device 60, the shape of which on the lower side corresponds to the outer shape of the preform 31, is lowered in direction of arrow A onto the workpiece carrier 40. In the lowered state, which is shown in FIG. 14b), a pressure p1 that is equal to or greater than the ambient pressure pu is applied to the connector 40p of the workpiece carrier 40, while a reduced pressure p2, which is less than the ambient pressure pu, is applied to a pressure connector 60p of the transfer unit 60. Thereby, the preform 31 is suctioned onto the transfer device 60, while the suction effect at the workpiece carrier 40, which served for the intermediate-fixing and/or the edge-fixing, is stopped. The preform can then be lifted off the workpiece carrier while maintaining the reduced pressure p2, as is shown in FIG. 14c) (movement of the transfer device 60 in the direction of arrow B).

As can be seen in FIG. 14, the transfer device 60 takes the finished-laid preform 31 from the workpiece carrier 40 and transfers the same, for example, into a mold for injection of resin and for curing. Alternatively, the preform can also be moved to an intermediate storage or to another processing station.

The "gripping" of the finished-laid preform 31 can be performed not only using reduced pressure but also mechanically, for example, by clamping, needles, electrostatic or magnetic holders etc. or by freezing or adhering as was already described above.

The transfer device also gives the possibility for draping the preform, as will be described hereinafter. The transfer device also gives the possibility to pack the finished-laid preform between two layers of resin films or foils and/or to do a form fixing.

Figure 16:
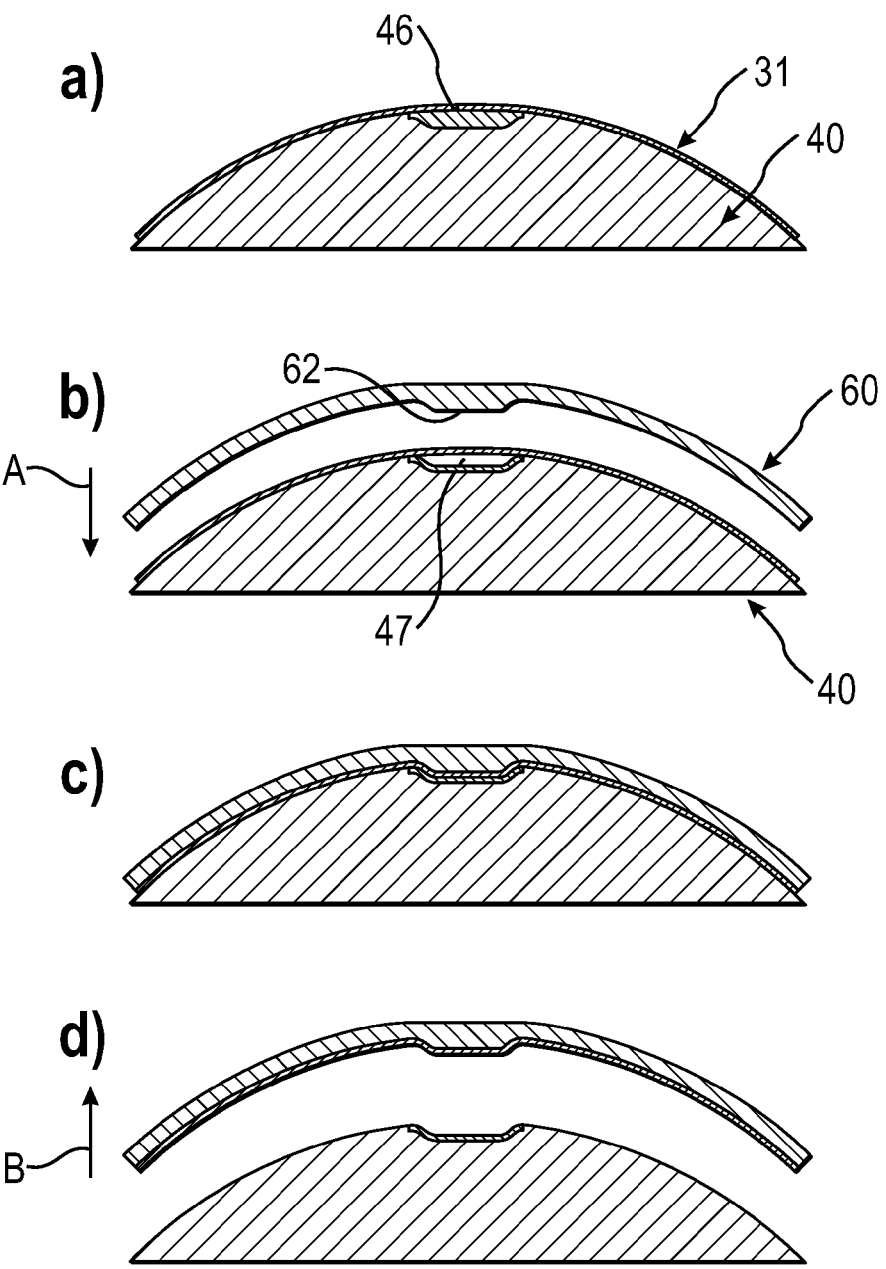
FIG. 16 schematic representations in cross-sectional views of a third embodiment of a transfer device which shows in a) to d) the sequence of the removal of the preform from the workpiece carrier using of the transfer device.

In FIGS. 15 and 16, possibilities for reshaping (draping) the finished-laid preform 31 using the transfer device 60 are shown. In FIG. 15, an embodiment is shown, with which the edge region of the preform 31 can be draped. For this purpose, the workpiece carrier 40 comprises edge-draping areas 45 which are moveable in direction of the arrows C (see FIG. 15b)). As can be seen from the sequence of FIG. 15a) to c), the transfer device is lowered onto the workpiece carrier 40 with the finished-laid preform 31. Then, the edge-draping areas 45 for draping the edge of the finished-laid preform 31 are moved and then the preform 31 draped in the edge region is removed from the workpiece carrier using the transfer device 60.

In FIG. 16, an embodiment for draping another region is shown. An insert 46 is inserted into a recess 47 in the workpiece carrier 40. The preform 31 is finished-laid onto the workpiece carrier 40 (FIG. 16a)), before the transfer unit 60 is lowered onto the workpiece carrier 40. Before the lowering of the transfer device 60, the insert 46 is removed, so that the recess 47 below the finished-laid preform 31 is present. The transfer device 60 comprises a draping protrusion 62 that is complementary to the recess 47.

As can easily be seen in FIG. 16c), the corresponding region of the finished-laid preform 31 is draped (reshaped) by the cooperation of the draping protrusion 62 and the recess 47 and is then lifted off the workpiece carrier 40 in the draped form (see FIG. 16d)).

That is, cooperating draping means 45, 46, 47, 62 are provided for draping the finished-laid preform 31 on the transfer device 60 and the workpiece carrier 40.

Figure 17:
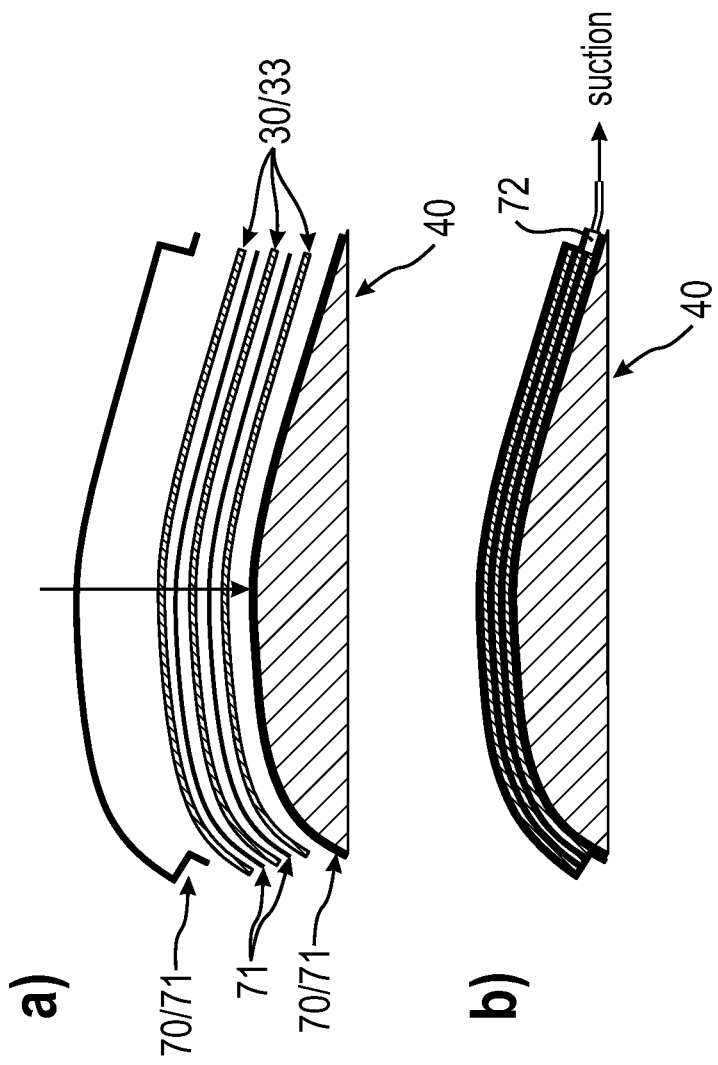
FIG. 17 a schematic representation of a vacuum stabilization of a preform and the introduction of resin films according to an embodiment of the invention.

FIG. 17 shows how a packing or a form fixing of the preform 31 is possible using foils 70 or resin films 71. For this purpose, for example, a foil 70 or a resin film 71 is deposited on the workpiece carrier before the fiber layers 30/33 are laid. Optionally, resin films 71 can also be deposited between some resin layers. After depositing of the last fiber layer, a foil 70 or a resin layer 71 is deposited. The outer foils 70 or the outer resin films 71 are connected to each other in an air-tight manner and then the air between the films is evacuated via an outlet 72.

In the packing between two resin layers 71 and, if applicable, the provision of resin layers 71 between some fiber layers, an advantage results in that the resin is already present within the structural component preform in the form of the resin films and the injection step can be omitted, even though dry fibers have been laid and the fibers have not been provided with resin or adhesive during the laying.

Thus, the foils and the resin layers can be pre-manufactured, sheet-like, two- or three-dimensionally shaped, thermoplastic or thermosetting resin layers or thermoplastic and/or thermosetting foils. They can also be created by pulling a sheet-like resin layer or foil over the fiber layers similar to a deep-drawing process or, for example, by spraying resin or a suitable polymer onto the fiber layers. As an alternative to the introduction of resin layers, hybrid fibers can be used that comprise thermoplastic and/or thermosetting fibers, in addition to the reinforcement fibers. The outermost foil(s) can also be functional foils which, for example, serve to realize high surface qualities equivalent to varnish. In another embodiment of the aspect, a preform can also be placed without resin films inside a pre-manufactured foil bag and/or tube foil portion, the open ends of which are subsequently closed.

Furthermore, this "packing" is advantageous because the shape of the preform can be stabilized by application of reduced pressure for an intermediate storage or for transporting. Fibers, resin films and foils form a unit which is stable during transport and is good for storing, which enables curing in a simple hot pressing device. Due to the shorter flow paths of the resin, the impregnation of the preform is shortened and thereby also the occupied time of the tool. Furthermore, the fiber warping due to flowing processes during the filling of the form cavity, which occur in resin injection processes, is avoided. A further advantage results in the simple handling of dry preforms of fiber layers and/or semi-finished product layers packed in this way because they can be, for example, automatically handled with simple reduced pressure manipulators.

Furthermore, this "packing" of the preform facilitates a subsequent reshaping, because the draping capability of the preform can be selectively influenced, for example, by the strength of the enclosed vacuum and/or the fixing of edges or of edge portions of the packing.

The "packing" and/or the form fixing is (are) equally advantageous for sheet-like preforms, whether they are two-dimensional sheet-like or three-dimensional sheet-like, because a form stable (=form fixed) transfer or storage is enabled. Here, sheet-like means similar to a sheet or like a sheet in the sense that structural components essentially forming a surface are meant, whose extension perpendicular to its surface is small in comparison to its extension along its surface, i.e., for example, at least 1:4 or 1:5 or 1:6 or 1:7 or 1:8 or 1:9 or 1:10 or ... or 1:100 or 1:101 or ... 1:200 or ... etc. When combined with resin layers, specific advantages result due to an additional reduction of the impregnating time. The outer layers (foils and resin films, respectively) are advantageously formed in an air-tight manner for this purpose such that the application of the reduced pressure, i.e. the evacuation of the intermediate space, is possible.

For this purpose, the preform to be packed does not need to be manufactured using the described device, as the description of the packing or the form fixing of the preform 31 using the foils 70 or resin films 71 with respect to FIG. 17 already shows. The use of multi-axial fabrics, fabrics etc. for forming the preform, which will be packed and/or form fixed, as described above with respect to FIG. 17, is equally possible.

After the device and the components of the device and the components of the device for manufacturing fiber layers and structural component preforms made of fibers have been described, a method for manufacturing of such fiber layers and structural component preforms is described in the following.

Figure 18:
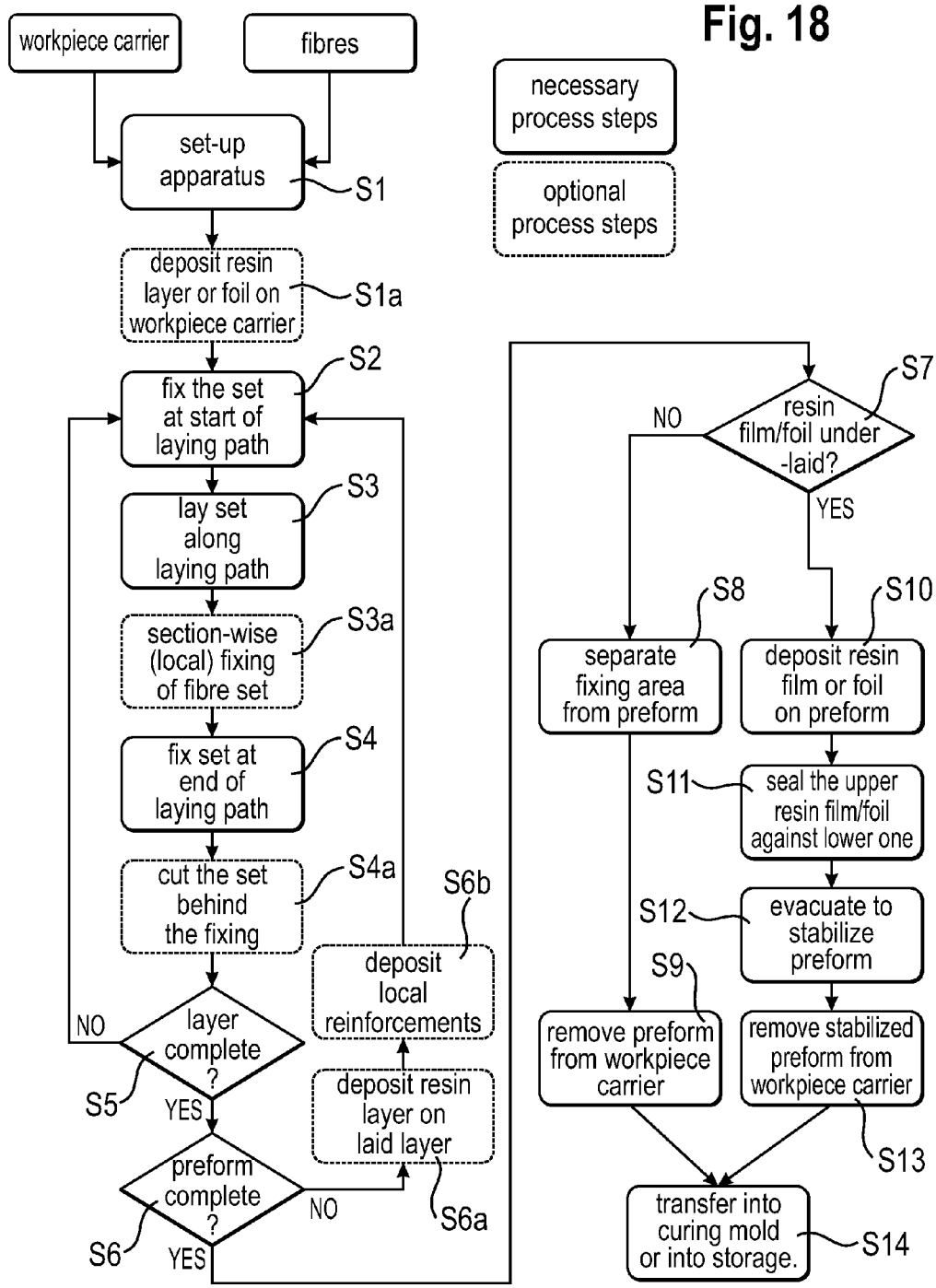
FIG. 18 a flow-chart of a method of manufacturing according to an embodiment of the invention.

As shown in FIG. 18, at first the apparatus is equipped with the workpiece carriers and the fibers (step S1). In step S1a, a resin layer or a foil can be laid on the workpiece carrier, as was described, e.g., with reference to FIG. 17. This step S1a is optional.

Then, in step S2, the fibers of the fiber set are fixed at the beginning of a laying path. Usually, this will be done in the edge-fixing area of the workpiece carrier. The edge area can, in this respect, also constitute a fixing area at the inner edge of a structural component or of a workpiece carrier, respectively, if the structural component comprises a larger section that will not be covered with fibers, such as, for example, a window or a manhole. The laying path to be followed in step S3 is predefined in a fiber laying pattern. In the optional step S3a, the fibers are intermediately fixed. At the end of the laying path, the fibers of the fiber set are fixed in the edge-fixing area (S4).

The fibers of the fiber set are optionally cut behind the edge-fixing (step S4a). Such a process has been shown in FIG. 8 in an exemplarily manner.

It is checked in step S5 whether the layer corresponding to the laying pattern is complete or not. If the layer has not yet been completely laid, a jump is made to step S2, in which the fiber set is fixed at the beginning of the laying path now to be followed for the layer. In case the laying path has to be continued at the same position (see, e.g., FIG. 7, this fixing has already been performed by performing the previous step S4).

In case the evaluation in step S5 results in that the layer has been completely laid, it is checked in step S6 whether the preform has been completely laid or not. If not, a resin layer is optionally deposited onto the laid layer in step 6a (see, e.g., FIG. 17) and in step S6b, local reinforcements are optionally deposited, and then the process continues with step S2. The steps S2 to S6b are repeated in the described manner until the preform has been completely laid. In this case, the evaluation in step S6 results in YES, such that the process continues to step S7. In step S7 it is checked whether resin layers or foils have been underlaid beforehand. The laying/depositing of one or more local inserts (e.g. pre-cut sheets of fabric or layers, pre-made embroideries, bands) onto the preform or inbetween the layers of the preform in step S6b, is effected to form local reinforcements.

If the evaluation in step S7 results in NO, then the portions of the fibers in the edge-fixing area are separated from the preform, for example, by cutting (step S8). As a result, the preform obtains its desired form. The cutting of the fixing area is optional. It may also be advantageous to maintain the fixing area on the preform (better preform stability, The fixing area can, for example, serve as a pinching edge in a resin injection tool.

If the evaluation in step S7 results in NO, then the portions of the fibers in the edge-fixing area are separated from the preform, for example, by cutting (step S8). As a result, the preform obtains its desired form. The cutting of the fixing area is optional. It may also be advantageous to maintain the fixing area on the preform (better preform stability). The fixing area can, for example, serve as a pinching edge in a resin injection tool.

If it is determined in step S7 that a resin layer or a foil has been underlaid, the method continues to step S10. In step S10, a resin film or a foil are deposited on the preform, which is located on the workpiece carrier. Then, the upper and lower resin film/foils are sealed against each other in step S11 and a reduced pressure for stabilizing the preform is applied in step S12. Then, in step S13, the stabilized preform is removed the workpiece carrier and the method proceeds to the already described step S14.

The described devices and methods can provide, inter alia, the following significant advantages:

A) Adhesive Application

The adhesive application is optional in general, i.e. other fixings of the fiber set at the edge or for intermediate-fixing are also possible.

Previously known resin and/or application systems mainly serve to impregnate the fibers with resin, in order to avoid the otherwise necessary and subsequent resin injection. With the invention, in particular adhesives with a high viscosity also can be used, which enable a fixing of the fiber set in the time frame of a second.

When an adhesive is used for fixing the fiber set, it is used preferably only in the fixing area at the beginning and at the end of a laying path. This results in that no additional, regulatory-relevant materials are introduced into the preform, and that the impregnation with resin is not hindered by the adhesive.

The device and the method facilitate an adhesive application onto the workpiece carrier as well as onto fibers already lying on the workpiece carrier as well as an application onto fibers which are still in the laying head and yet to be deposited.

When fixing the fiber set using adhesive, an adhesive bead KS is applied to the fiber set 30 to be laid at the beginning and at the end of a laying path. Low viscosity adhesives completely impregnate the fiber (roving), which consists of a plurality of filaments, such that all filaments are securely fixed. Higher viscosity adhesives (viscosity greater than or equal to 1500 mPas), however, do not completely impregnate the fiber but essentially adhere to the side of the fiber, onto which the adhesive bead KS has been applied. Due to the filaments not being fixed with the adhesive, a separating layer is formed. In this case it can happen that, when fixing another fiber set onto an already-laid set and when the tension force occurs along the fiber set during the laying of the share, the fixing rips apart at the separating layer. The lower fiber set is divided, so to speak. In order to solve this problem, gaps 301 are introduced into the fiber set in the area of the fixing. Thereby, the higher viscosity adhesive can better impregnate the fibers and a separating layer is avoided.

This process is shown in FIG. 19. FIG. 19a) shows the undisturbed fiber set. A plurality of bodies are pushed through the set as shown in FIG. 19b). These bodies can be, e.g., needles 42z of a needle bar. When the fiber set is pulled a little bit in the laying direction (see the arrows in FIG. 19c)), the gaps (301 in 19c)) are created, through which the higher viscosity adhesive of the adhesive bead KS (FIG. 19d)) also reaches the back side of the fiber set and thus prevents potential separating points. The arrangement of the bodies 42z, which create the gaps 301 in the set, can be freely selected. A uniform distribution over the width of the roving set is advantageous.

B) Use of Different Fiber Types

In particular due to the fact that the fibers are laid in a dry state, the use of different fiber types in one process step is possible, i.e., e.g., mixed in one layer or the like. For example, glass fibers and carbon fibers could be mixed with one head and be subsequently laid. In case they should be laid successively, two fiber sets, for example, a glass fiber set and a carbon fiber set, could be transported separately in two supply devices 52 to the laying head, which then comprises two conveying mechanisms, if necessary.

C) Variation of the Laying Width of the Fiber Set

It is made possible to vary the width of the laid fiber set, wherein the width of the individual fibers (rovings) of the set can be adjusted, for example, by spreading or constricting, restricting, narrowing. This happens in the laying head, and it is done, e.g., by varying the redirection radii or the degree of redirection.

By varying the laying widths, the area density of the fiber set can be set.

D) Possibility for Combination with Other Preforms

Due to the use of dry fibers for building up the preform, there is the possibility to supplement the preform manufactured with the described method with other preforms into a more complex structure, wherein the other preforms may be manufactured with other preforming methods, such as e.g., braiding, embroidery or fiber molding. Furthermore, there is the possibility to reinforce a preform manufactured with the method described herein, for example, by stitching.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention.

Hereinafter, aspects of the described invention are indicated:

1. Method for building up a preform for a structural component made of a fiber composite material, comprising the following steps:

a) providing (S1) a workpiece carrier (40);

b) laying (S3) a fiber set (30) made of dry fibers (33) on the workpiece carrier (40), wherein optionally the fibers are intermediately fixed in sections (S3a);

c) fixing (S4) the fibers at the edge (42) of the workpiece carrier (40);

d) repeating steps b) and c) according to a predetermined fiber set laying pattern for forming the preform (31), wherein, after each performance of step d), either the raw fibers are cut behind the sections of the fibers fixed at the edge of the workpiece carrier (S4a) and the subsequent performance of step b) follows subsequently, or the performance of step b) takes place without cutting the raw fibers; and e) after concluding the forming the preform according to the predetermined fiber set laying pattern in step d), transferring (S14) the preform (31) from the workpiece carrier (40) to the next manufacturing step.

2. Method according to aspect 1 for building up a three-dimensional preform for a structural component made of a fiber composite material, wherein in step a), a workpiece carrier (40) corresponding to the three-dimensional shape of the preform (31) is provided (S1), and in step e) the three-dimensional preform (31) is transferred from the workpiece carrier (40) to the next manufacturing step.

3. Method for building up a three-dimensional preform for a structural component made of a fiber composite material, comprising the following steps:

a) providing (S1) a workpiece carrier (40) corresponding to the three-dimensional shape of the preform (31);

b) laying (S3) a fiber set made of dry fibers (33) on the workpiece carrier (40), wherein optionally the fibers are intermediately fixed in sections (S3);

c) fixing (S4) the fibers (33) at the edge (42) of the workpiece carrier (40);

d) repeating steps b) and c) according to predetermined fiber set laying pattern for forming the three-dimensional preform (31), wherein, after each performance of step d), either the raw fibers are cut behind the sections of the fibers fixed at the edge of the workpiece carrier (S4a) and the next performance of step b) follows subsequently, or the performance of step b) takes place without cutting the raw fibers; and e) after concluding the forming of the preform according to the predetermined fiber set laying pattern in step d), transferring (S14) the three-dimensional preform (31) from the workpiece carrier (40) to the next manufacturing step.

4. Method according to one of aspects 1 to 3, wherein, during the forming of the preform according to the predetermined fiber set laying pattern in step d), an application of one or more local inserts on the preform or between the layers of the preform takes place to form a local reinforcement.

5. Method according to one of aspects 1 to 4, wherein, in step e), the sections fixed in the edge-fixing are separated (S8) before the transfer (S 14) of the preform (31).

6. Method according to one of aspects 1 to 5, wherein the optional intermediate-fixing in sections in step b) is performed by application of resin or adhesive (KS) on the workpiece carrier (40) and/or on the fibers (33) in sections, and/or by freezing and/or by mechanical holding and/or by sucking and/or by magnetic attraction and/or by electrostatic attraction of the fibers to the workpiece carrier.

7. Method according to one of aspects 1 to 6, wherein the edge-fixing in step c) is performed by adhering and/or clamping and/or freezing and/or mechanical holding and/or sucking and/or magnetic attraction and/or electrostatic attraction of the fibers to the workpiece carrier.

8. Method according to one of aspects 1 to 7, wherein the manufacturing step that follows step e) is the setting of the preform into a processing mold for resin injection and/or curing or an intermediate storing or a transfer to a further processing step.

9. Method according to one of aspects 1 to 8, wherein the two- or three-dimensional preform is packed and/or form fixed between fixing layers (70, 71) for the transfer and potential storage.

10. Apparatus for building up a preform (31) for a structural component made of a fiber composite material, comprising a workpiece carrier (40), a laying head (20) for laying a fiber set (30) made of dry fibers (33) on the workpiece carrier (40), an optional intermediate-fixing device for an optional intermediate-fixing in sections of the fibers on the workpiece carrier (40), an edge-fixing device for fixing the fibers (33) at the edge (42) of the workpiece carrier (40), a fiber cutting device (21) for cutting the fibers, and a transfer device for transferring the preform (31) from the workpiece carrier (40) to a next manufacturing step.

11. Apparatus for building up a three-dimensional preform (31) for a structural component made of a fiber composite material, comprising a workpiece carrier (40) having a form corresponding to the three-dimensional shape of the preform (31), a laying head (20) for laying a fiber set (30) made of dry fibers (33) on the workpiece carrier (40), an optional intermediate-fixing device for optional intermediate-fixing in sections of the fibers on the workpiece carrier (40), an edge-fixing device for fixing the fibers (33) at the edge (42) of the workpiece carrier (40), a fiber cutting device (21) for cutting the fibers, and a transfer device for transferring the three-dimensional preform (31) from the workpiece carrier (40) to a next manufacturing step.

12. Transfer device for transferring a three-dimensional preform (31) from a workpiece carrier (40) to a next manufacturing step, the shape of which on its lower side corresponds to the outer shape of the preform (31) finished-laid on the workpiece carrier (40) and which optionally comprises a draping area (62) for draping the preform (31) finished-laid on the workpiece carrier (40).

13. Workpiece carrier for a three-dimensional preform (31) for a structural component made of a fiber composite material, comprising a workpiece carrier (40) comprising a workpiece forming area (41) having a form corresponding to the three-dimensional shape of the preform (31), and an edge-fixing area (42) for fixing the fibers (33) of a laid fiber set (30).

14. Workpiece carrier according to aspect 13, which comprises one or more intermediate-fixing areas (43) for fixing the fibers (33) of a laid fiber set (30).

15. Workpiece carrier according to aspect 13 or 14, which comprises a draping area (45; 46, 47) for draping a finished-laid preform (31).

16. Fiber guiding device for guiding one or a plurality of fibers (33) of a fiber set (30) to be conveyed by a fiber conveying device, comprising an inlet, into which the fibers (33) to be conveyed are inserted in a fiber supply direction (V), an outlet, out of which the fibers (33) to be conveyed are guided out in the fiber supply direction (V), and a fiber guiding chain (52), which connects the inlet with the outlet and in which the fibers (33) to be conveyed are guided in the fiber supply direction (V) via rotatably-supported shafts (52w) or rollers (52r), which are rotatably supported independently of each other.

17. Fiber guiding device according to aspect 16, wherein the fiber guiding chain (52) comprises a plurality of chain segments (52s), which are connected to each other such that adjacent segments can rotate relative to each other around an axis (A) and the rotatably-supported shafts (52w) or the rotatably-supported rollers (52r) are each arranged in the axial direction of the axes (A) and rotatably around the same.

18. Fiber cutting device, comprising
a abutment (220),
a pusher (210) and
a cutting blade (230) with a large blade angle, which is moveable back and forth in a cutting direction, wherein the abutment and the pusher are arranged and are moveable such that they form, in a passage position, a fiber passage between them, which extends perpendicularly to the cutting direction, and, in a clamping position, clamp a fiber in the fiber passage on both sides of the moving path of the cutting blade.

19. Apparatus for building up a three-dimensional preform (31) for a structural component made of a fiber composite material according to aspect 11, wherein the workpiece carrier (40) is a workpiece carrier according to one of aspects 13 to 15, the laying head (20) is connected to the outlet of a fiber guiding device (52) according to aspect 16 or 17 and the fiber set (30) is supplied via this fiber guiding device, and the laying head comprises a fiber cutting device (21) according to aspect 18.

20. Method for building up a sheet-like preform for a structural component made of a fiber composite material, comprising the following steps:

forming a preform by laying (S3) fiber layers (30, 33) on a workpiece carrier (40); and air-tight packing the preform between a first layer (70, 71) on one side of the sheet-like preform and a second layer (70, 71) on a second side of the sheet-like preform opposite to the first side and evacuating the intermediate space between the layers.

21. Method according to aspect 20, wherein
a workpiece carrier (40) corresponding to the shape of the sheet-like preform (31) having the first layer (70), which is laid thereon, is provided (S1), fiber layers (30, 33) are laid on the workpiece carrier (40) to form the preform (S3) and after concluding the forming of the preform, the second layer (70, 71) is deposited on the last fiber layer (30, 33) and is connected with the first layer (70, 71) to pack the preform between the same.

22. Method according to aspect 20 or 21, wherein, during the forming of the preform, a layer (70, 71) is deposited between one or more of the fiber layers (30, 33).

23. Method according to one of the aspects 20 to 22, wherein the air between the first layer (70, 71) and the second layer (70, 71) is evacuated.

24. Method according to one of the aspects 20 to 23, wherein the layers are formed as a foil (70) or as a resin film (71).

25. Method according to one of the aspects 20 to 24, wherein a three-dimensional preform is formed on a workpiece carrier (40), which has a shape corresponding to the preform.

26. Method according to one of the aspects 1 to 9, 20 to 25, wherein the resin or adhesive (KS) is applied to the fibers for the fixing and the fibers are provided with one or more gaps (301) between filaments of the fiber (33) in the area of the application.

The invention claimed is:

1. A method of manufacturing a three-dimensional preform for a structural component made of a fiber composite material, the method comprising:
   a) simultaneously laying a plurality of dry rovings along a laying path on a workpiece carrier having a contour that corresponds to an intended three-dimensional shape of the preform;
   b) at the end of or after completing step a), fixing the rovings at an end of the laying path to an edge of the workpiece carrier by performing one or more fixing technique selected from the group consisting of: adhering, clamping, freezing, mechanical retention, suctioning, magnetic attraction and/or electrostatic attraction of the rovings to the workpiece carrier;

c) repeating steps a) and b) in accordance with a predetermined fiber laying pattern until the three-dimensional preform has been completely formed, wherein before each step a) is performed again, the rovings laid in the preceding step a) are cut beyond a segment of the rovings that will be or has been fixed on the edge of the workpiece carrier;

d) packing and/or form-fixing the three-dimensional preform between a plurality of fixing foils; and e1) removing the three-dimensional preform, which is packed and/or form-fixed between the plurality of fixing foils, from the workpiece carrier and transferring it to a subsequent manufacturing step that comprises one or more of: (i) setting the preform into a processing mold configured for resin injection and/or curing, (ii) temporarily storing the preform and/or (iii) transferring the preform to a further processing step.

2. The method according to claim 1, further comprising fixing the rovings on the workpiece carrier at at least one intermediate location between end segments of the rovings by performing one or more fixing technique selected from the group consisting of: applying resin and/or adhesive onto at least one portion of the workpiece carrier and/or the fibers, freezing, mechanical retention, suctioning, magnetic attraction and/or electrostatic attraction of the rovings to the workpiece carrier.

3. The method according to claim 1, further comprising:
during the formation of the preform in accordance with a predetermined fiber laying pattern, depositing at least one local insert on the preform and/or between the layers of the preform to form at least one local reinforcement.

4. The method according to claim 1, further comprising:
prior to step e), separating segments of the rovings fixed in step b) from the preform.

5. The method according to claim 1, wherein the plurality of dry rovings are disposed in a parallel, spaced-apart relationship in step a).

6. The method according to claim 1, wherein when step a) is repeated in step c), the plurality of dry rovings are laid in a different orientation than the preceding layer of dry rovings.

7. The method according to claim 1, wherein the rovings comprise carbon fibers, glass fibers and/or aramid fibers.

8. The method according to claim 1, wherein, in step a), the dry rovings are laid on the workpiece carrier without application of binder or adhesive to the dry rovings.

9. A method of manufacturing a three-dimensional preform, the method comprising:
fixing first ends of a first plurality of dry rovings on an edge of a workpiece carrier having a contour that corresponds to an intended three-dimensional shape of the perform;
simultaneously laying the first plurality of dry rovings across the workpiece carrier, the first plurality of dry rovings being disposed in a parallel, spaced-apart relationship;
fixing second ends of the first plurality of dry rovings on the same or a different edge of the workpiece carrier;
cutting the first plurality of dry rovings beyond the second end that is fixed to the workpiece carrier, the cutting being performed either before or after the second ends of the first plurality of dry rovings are fixed to the same or different edge of the workpiece carrier;
fixing first ends of a second plurality of dry rovings on the same or a different edge of the workpiece carrier;
simultaneously laying the second plurality of dry rovings across the workpiece carrier, the second plurality of dry rovings being disposed in a parallel, spaced-apart relationship and the second plurality of dry rovings being disposed in a non-parallel relationship with the first plurality of dry rovings;
fixing second ends of the second plurality of dry rovings on the same or a different edge of the workpiece carrier;
cutting the second plurality of dry rovings beyond the second end that is fixed to the workpiece carrier, the cutting being performed either before or after the second ends of the second plurality of dry rovings are fixed to the same or different edge of the workpiece carrier; and
after all layers of the three-dimensional preform have been laid, packing and/or form-fixing the three-dimensional preform between a plurality of fixing foils and then removing the three-dimensional preform from the workpiece carrier and transferring it to a subsequent manufacturing step.

10. The method according to claim 9, further comprising fixing the dry rovings to the workpiece carrier at at least one intermediate location between the first and second ends of the dry rovings,
wherein the dry rovings each comprise a plurality of carbon fibers, glass fibers and/or aramid fibers.

11. A method of manufacturing a three-dimensional preform for a structural component made of a fiber composite material, the method comprising:
a) simultaneously laying a plurality of dry rovings, without application of binder or adhesive to the dry rovings, along a laying path on a workpiece carrier having a contour that corresponds to an intended three-dimensional shape of the preform, the workpiece carrier comprising a workpiece forming area and an edge-fixing area disposed around a periphery of the workpiece forming area;
b) at the end of or after completing step a), cutting the rovings and adhering the rovings with an adhesive at an end of the laying path to the edge-fixing area of the workpiece carrier by applying the adhesive only to an end segment of each roving such that the rovings are fixed by adhering with the adhesive only the end segments of the rovings to the edge-fixing area of the workpiece carrier;
c) repeating steps a) and b) in accordance with a predetermined fiber laying pattern until the three-dimensional preform has been completely formed, wherein (i) before each step a) is performed again, the rovings laid in the preceding step a) are cut beyond a segment of the rovings that will be or has been adhered with the adhesive on the edge-fixing area of the workpiece carrier and (ii) at the end of step c), the rovings are adhered with the adhesive to only the edge-fixing area; and
d) after the three-dimensional preform has been completely formed, removing the three-dimensional preform from the workpiece carrier and transferring it to a subsequent manufacturing step.

12. The method according to claim 11, further comprising, between step c) and step d), cutting portions of the rovings along the edge-fixing area to separate the preform from the workpiece carrier.

13. The method according to claim 11, further comprising fixing the rovings on the workpiece carrier at at least one intermediate location between the end segments of the rovings by performing one or more fixing technique selected from the group consisting of: freezing, mechanical retention, suctioning, magnetic attraction and/or electrostatic attraction of the rovings to the workpiece carrier.

14. The method according to claim 11, further comprising:
   during the formation of the preform in accordance with a predetermined fiber laying pattern, depositing at least one local insert on the preform and/or between the layers of the preform to form at least one local reinforcement.

15. The method according to claim 11, further comprising:
   prior to step d), separating segments of the rovings fixed in step b) from the preform.

16. The method according to claim 11, wherein the subsequent manufacturing step comprises one or more of:
   setting the preform into a processing mold configured for resin injection and/or curing,
   temporarily storing the preform and/or
   transferring the preform to a further processing step.

17. The method according to claim 16, wherein, between step c) and step d), the three-dimensional preform is packed and/or form-fixed between a plurality of fixing foils.

18. The method according to claim 11, wherein the plurality of dry rovings are disposed in a parallel, spaced-apart relationship in step a).

19. The method according to claim 11, wherein when step a) is repeated in step c), the plurality of dry rovings are laid in a different orientation than the preceding layer of dry rovings.

20. The method according to claim 11, wherein the rovings comprise carbon fibers, glass fibers and/or aramid fibers.

\* \* \* \* \*